United States Patent

Naito

(10) Patent No.: US 9,756,213 B2
(45) Date of Patent: Sep. 5, 2017

(54) COMMUNICATION APPARATUS CAPABLE OF SELECTING PROPER FACSIMILE COMMUNICATION, METHOD OF CONTROLLING THE SAME, AND STORAGE MEDIUM

(71) Applicant: CANON KABUSHIKI KAISHA, Tokyo (JP)

(72) Inventor: Yosui Naito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/738,020

(22) Filed: Jun. 12, 2015

(65) Prior Publication Data

US 2015/0365560 A1 Dec. 17, 2015

(30) Foreign Application Priority Data

Jun. 16, 2014 (JP) .................................. 2014-123321

(51) Int. Cl.
*G06F 15/00* (2006.01)
*H04N 1/327* (2006.01)
(Continued)

(52) U.S. Cl.
CPC ..... *H04N 1/32765* (2013.01); *H04L 65/1006* (2013.01); *H04L 65/1069* (2013.01);
(Continued)

(58) Field of Classification Search
CPC ............. H04N 1/0022; H04N 1/32765; H04N 1/32767; H04N 2201/0093; H04L 65/1006; H04L 65/1033
(Continued)

(56) References Cited

U.S. PATENT DOCUMENTS

2004/0184110 A1* 9/2004 Maei .................. H04N 1/00209
358/400
2006/0136596 A1* 6/2006 Izumi .................. H04L 12/5692
709/230
(Continued)

FOREIGN PATENT DOCUMENTS

JP 2013121048 A 6/2013

OTHER PUBLICATIONS

Machine translation of Japanese Patent Document No. 2001-245070, Usu, Sep. 7, 2001.*

*Primary Examiner* — Mark Milia
(74) *Attorney, Agent, or Firm* — Rossi, Kimms & McDowell LLP

(57) ABSTRACT

A communication apparatus capable of selecting proper facsimile communication according to a gateway of a connection destination. A communication apparatus that performs facsimile communication via a gateway connected to an IP network establishes a voice session for performing voice communication, with the gateway. When a T.38 session establishment request is received after the voice session has been established, the voice session is changed to the T.38 session to perform facsimile communication using T.38 communication. When the T.38 session establishment request is not received after the voice session has been established, facsimile communication using inband communication is performed by the voice session.

12 Claims, 14 Drawing Sheets

(51) Int. Cl.
*H04L 29/06* (2006.01)
*H04N 1/00* (2006.01)

(52) U.S. Cl.
CPC ....... *H04L 65/4015* (2013.01); *H04N 1/0022* (2013.01); *H04N 1/32767* (2013.01); *H04N 2201/0093* (2013.01)

(58) Field of Classification Search
USPC ........................................................ 358/1.15
See application file for complete search history.

(56) References Cited

U.S. PATENT DOCUMENTS

2012/0051528 A1* 3/2012 Utsumi .................. H04N 1/327
 379/100.05
2013/0151715 A1* 6/2013 Nakagawa .......... H04L 65/1069
 709/227

* cited by examiner

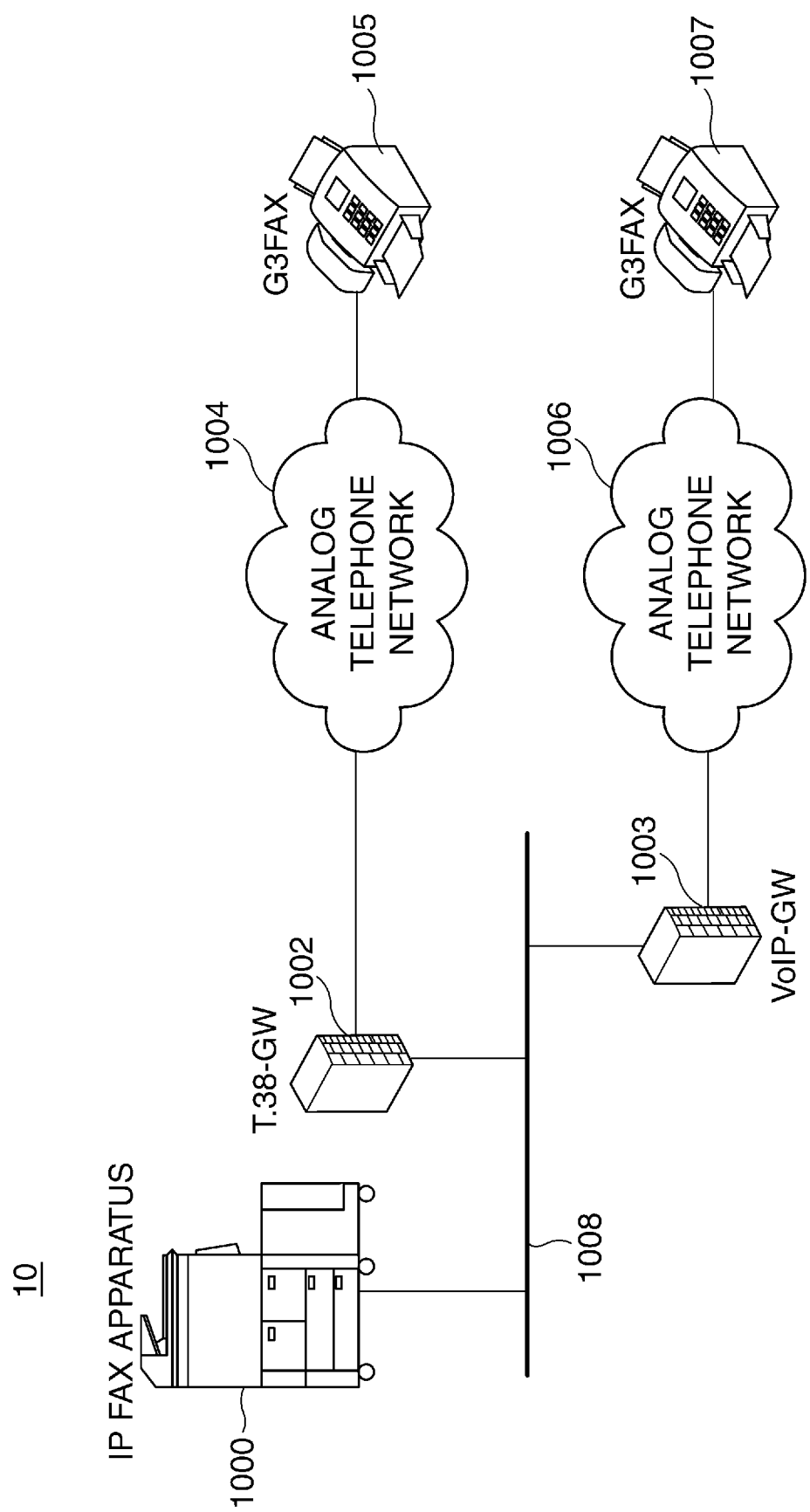

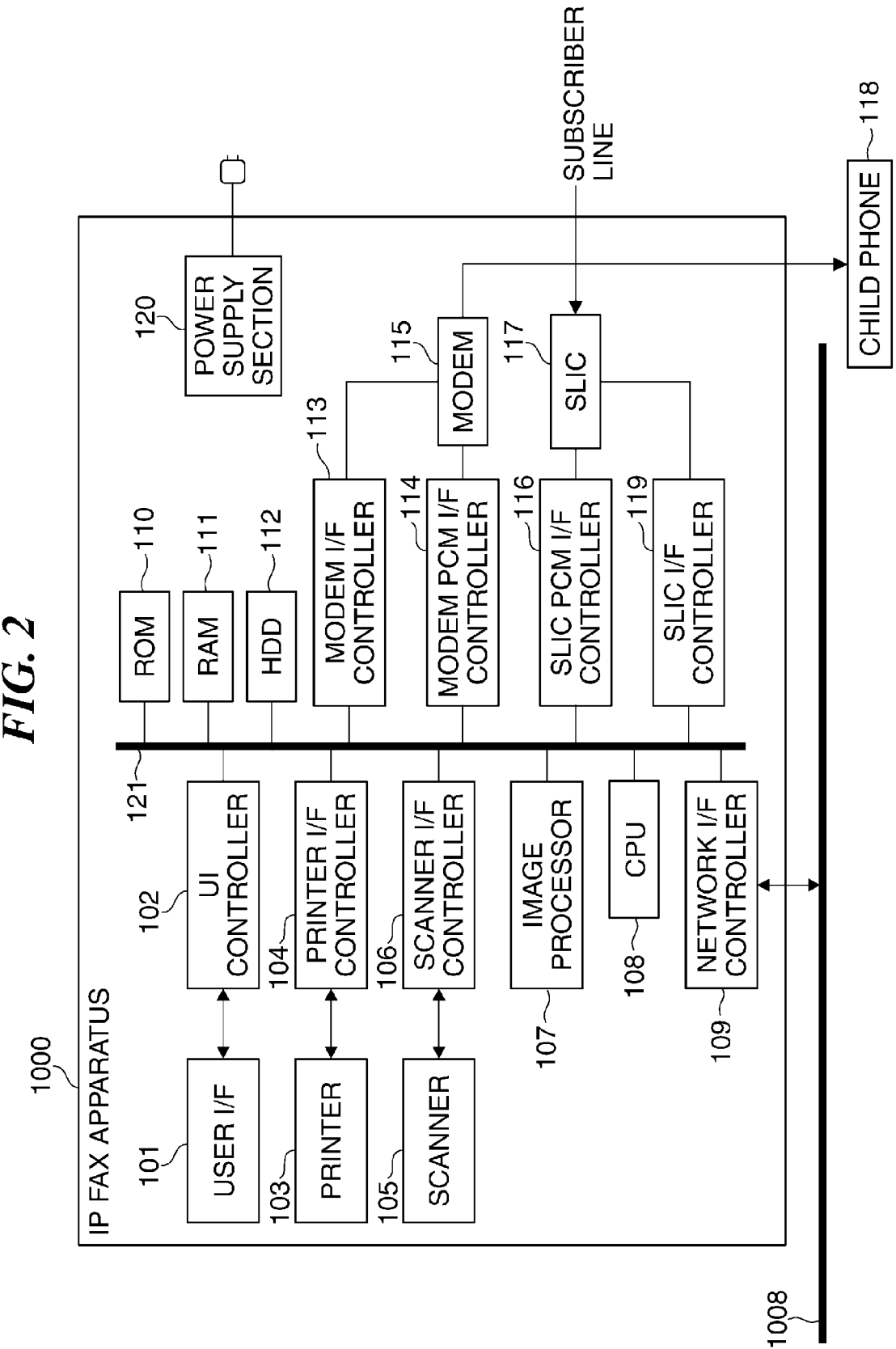

FIG. 3A (Re-)INVITE

| | |
|---|---|
| IP header | ~201 |
| UDP/TCP header | ~202 |
| SIP | ~203 |
|   Request : INVITE | ~204 |
|   Message Header | ~205 |
|     From : 0311110001@192.168.1.1 | ~206 |
|     To    : 0322220002@192.168.1.2 | ~207 |
|     · · · · · | |
|   Message Body | ~208 |
|     SDP | ~209 |
|       Media Type : audio | ~210 |
|       Media Format : G.711 | ~211 |
|       Media Format : G.726 | |
|       · · · · · | |

| | |
|---|---|
| IP header | ~201 |
| UDP/TCP header | ~202 |
| SIP | ~203 |
|   Status : 200 OK | ~212 |
|   Message Header | ~205 |
|     From : 0322220002@192.168.1.2 | ~206 |
|     To    : 0311110001@192.168.1.1 | ~207 |
|     · · · · · | |
|   Message Body | ~208 |
|     SDP | ~209 |
|       Media Type : audio | ~210 |
|       Media Format : G.711 | ~211 |
|       · · · · · | |

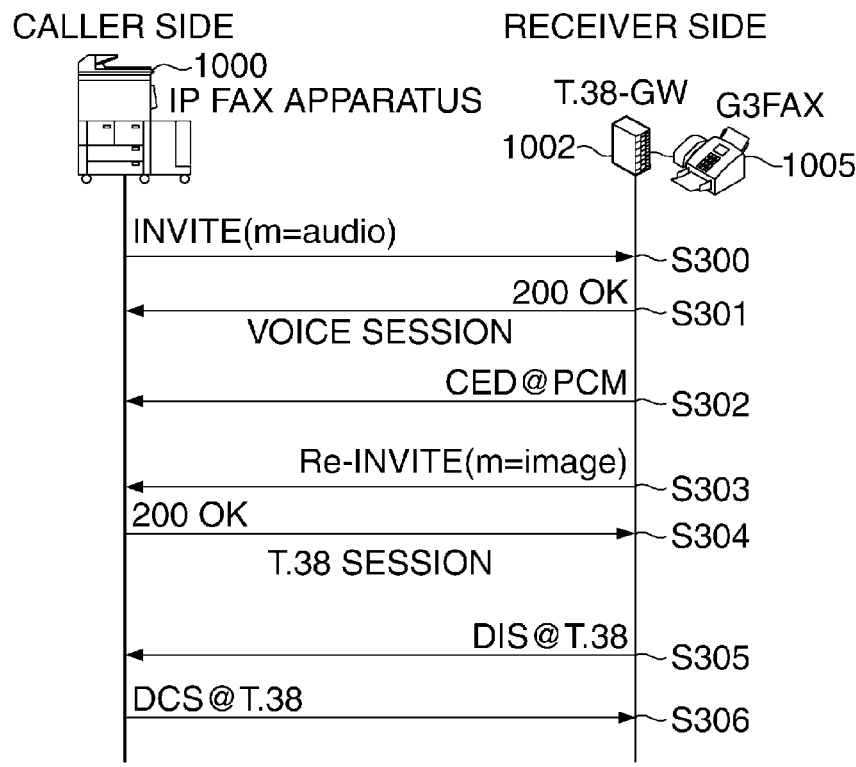
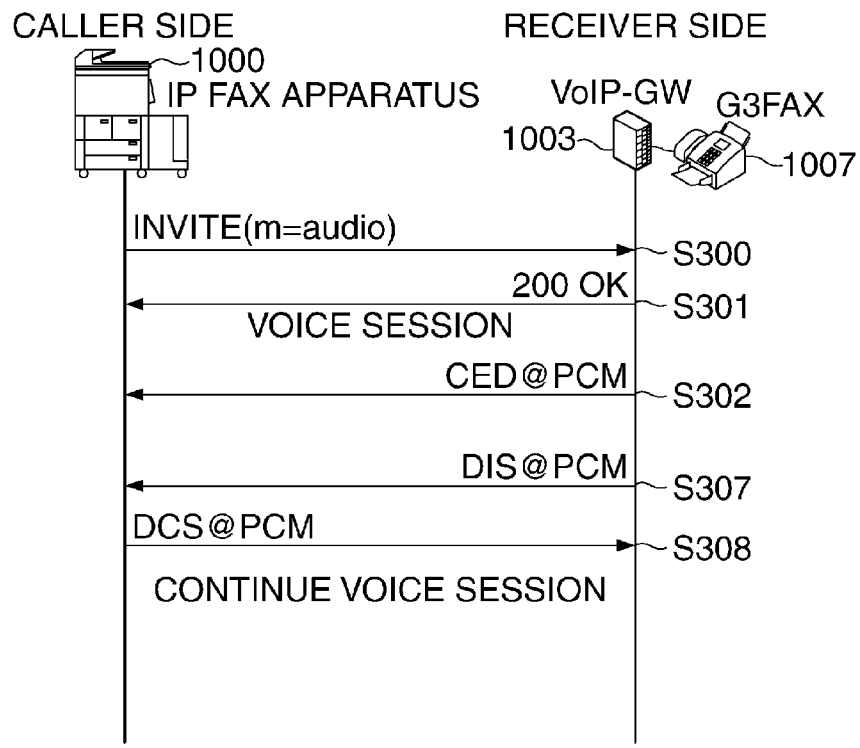

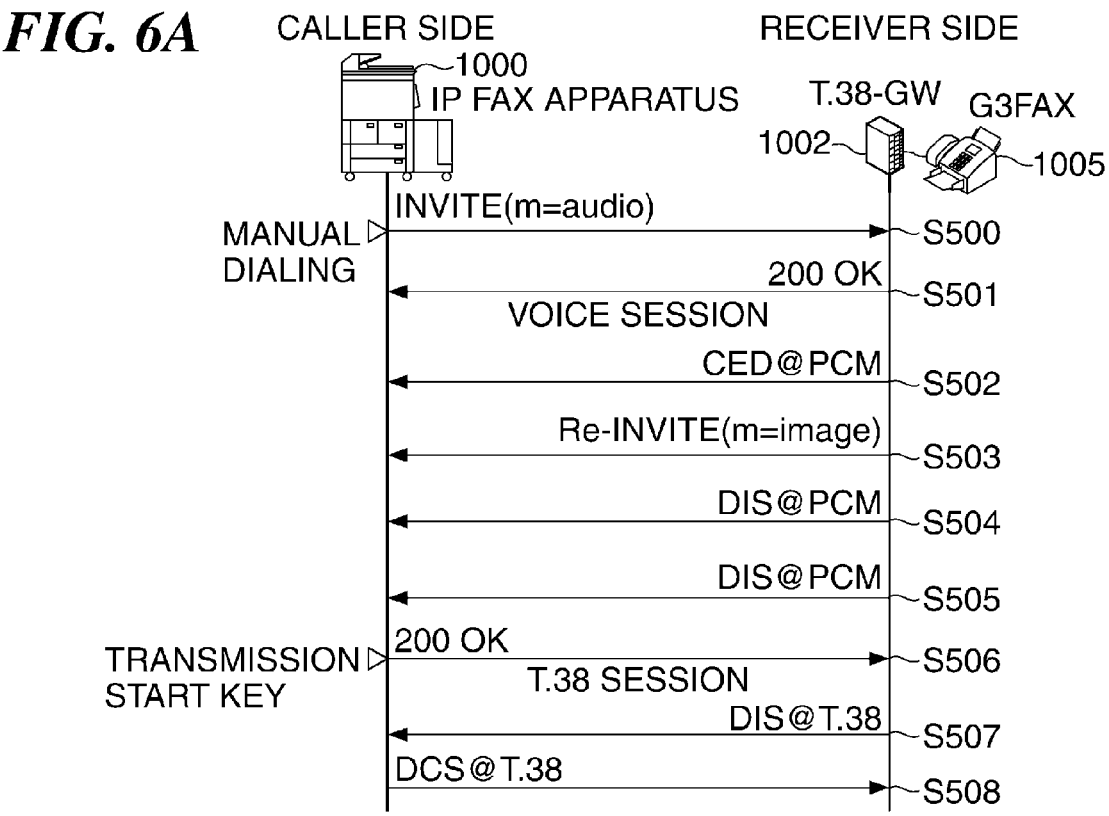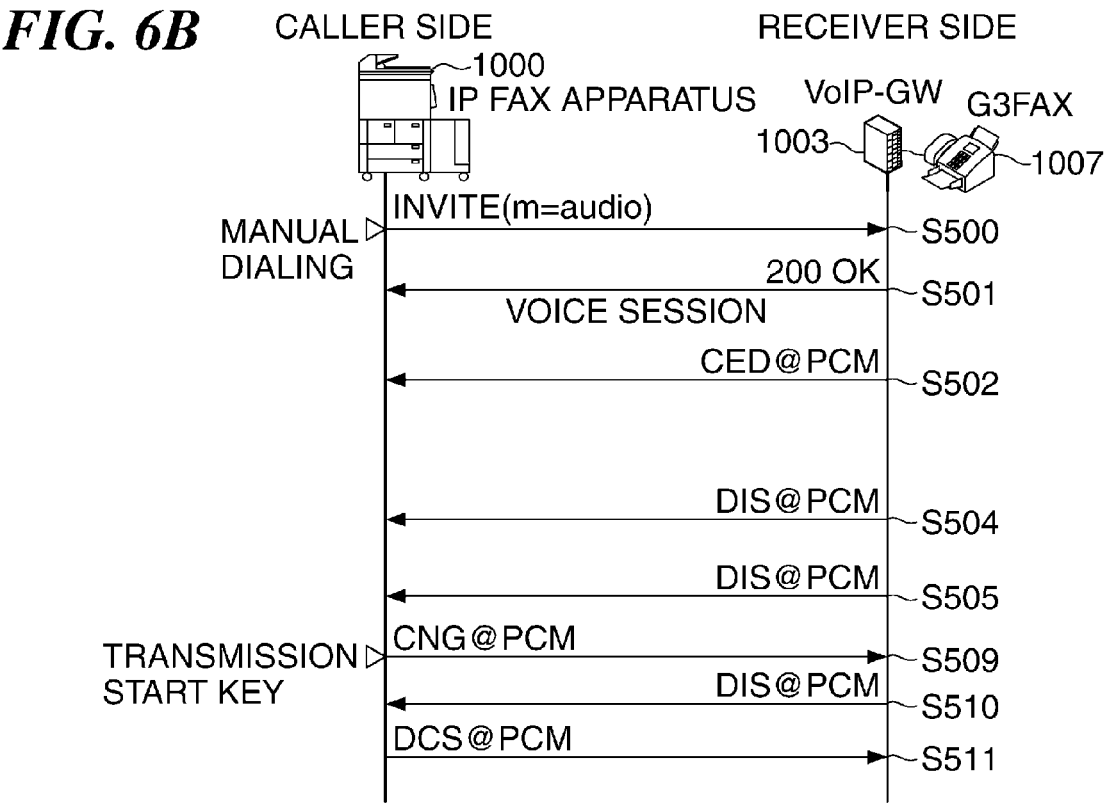

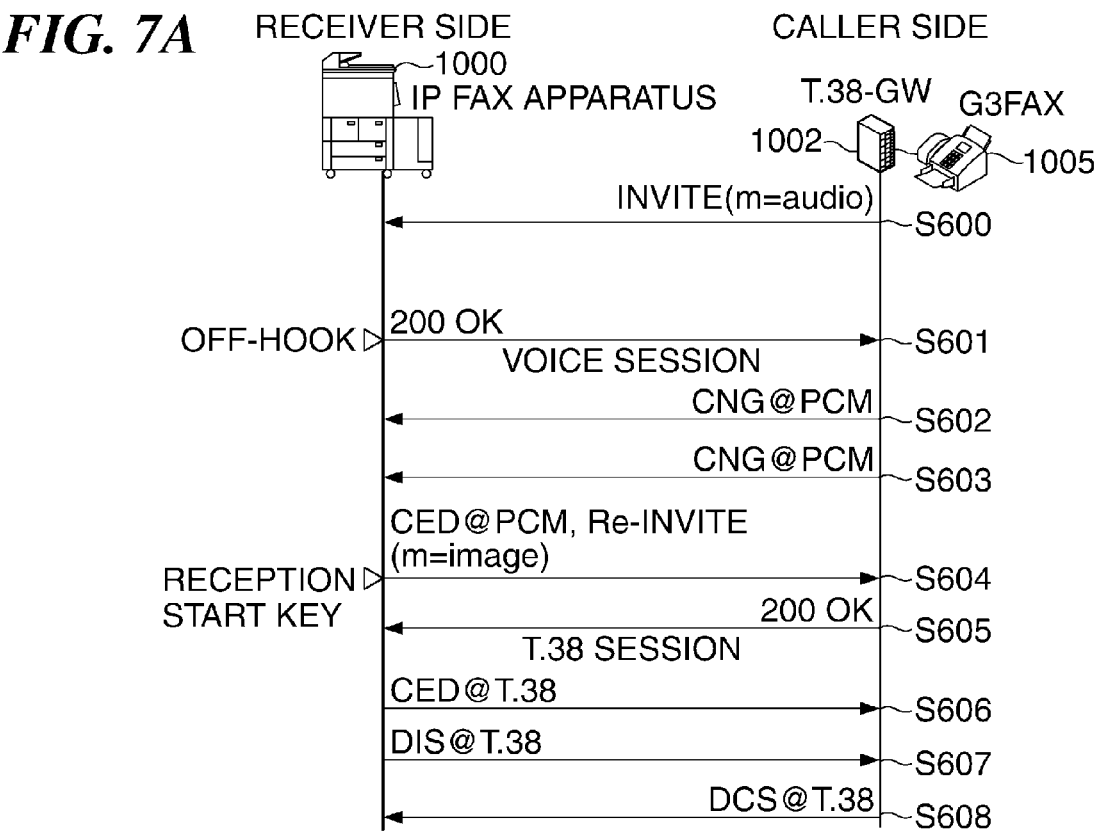
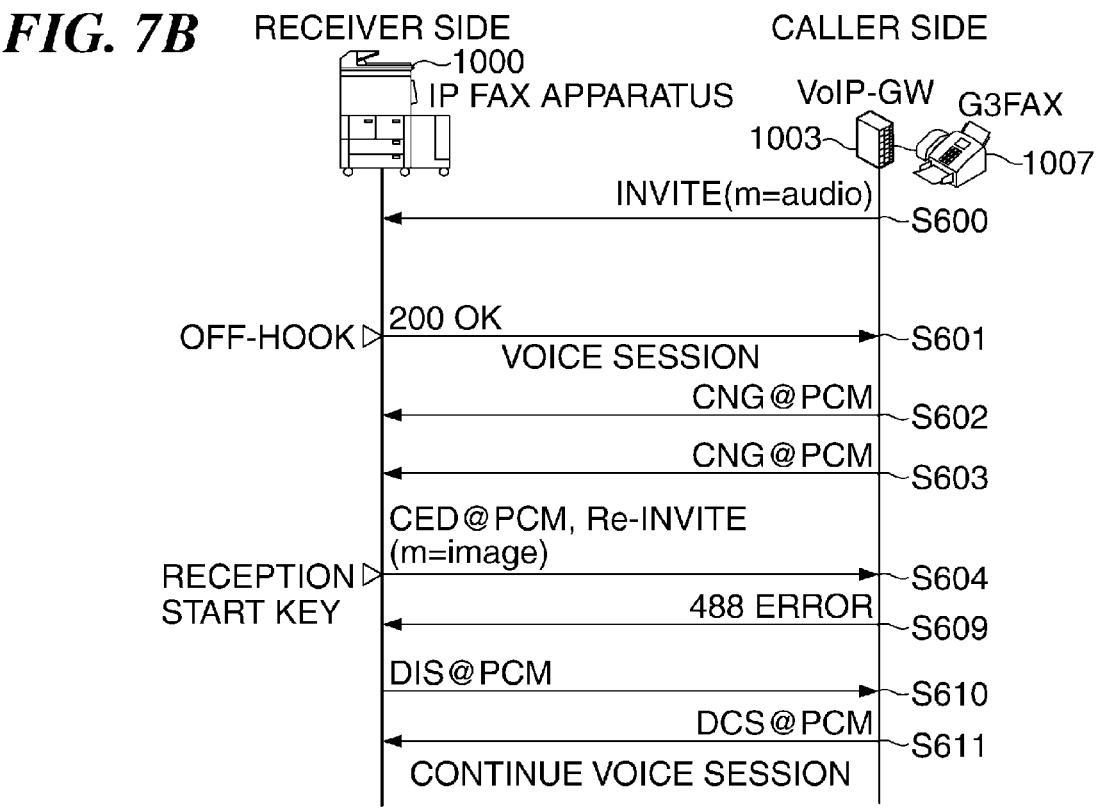

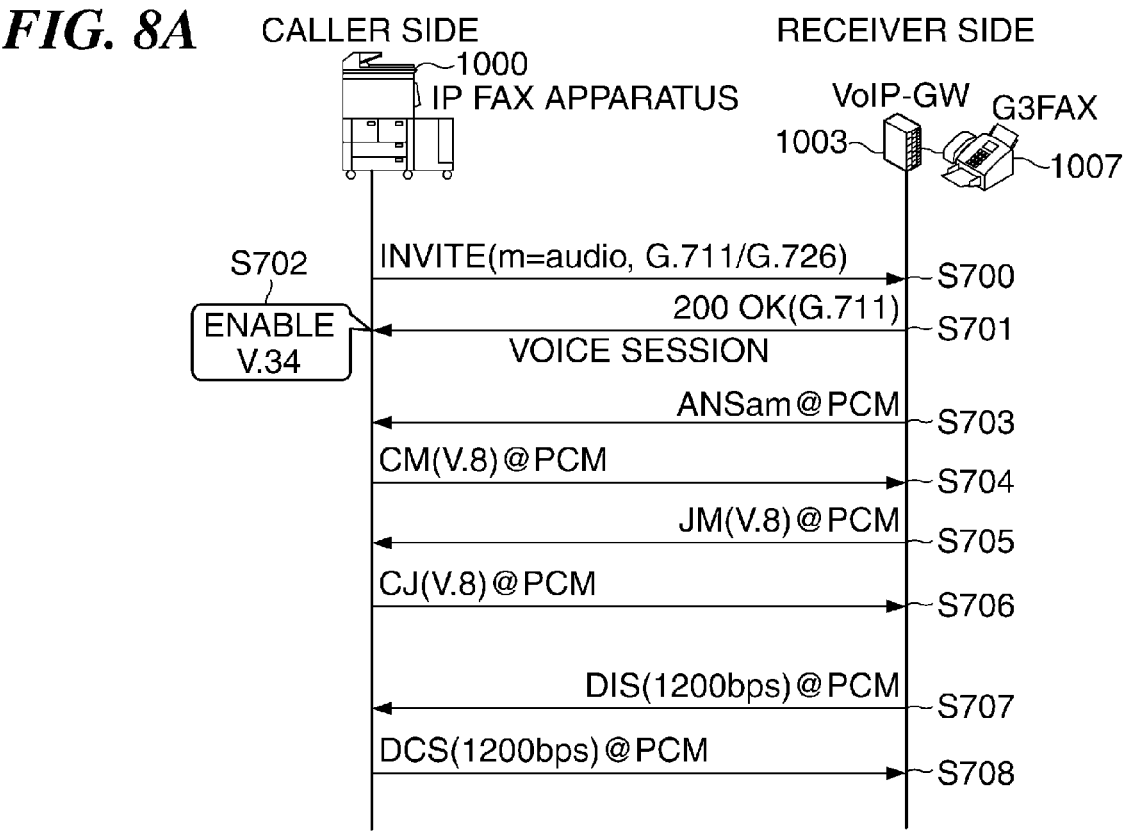
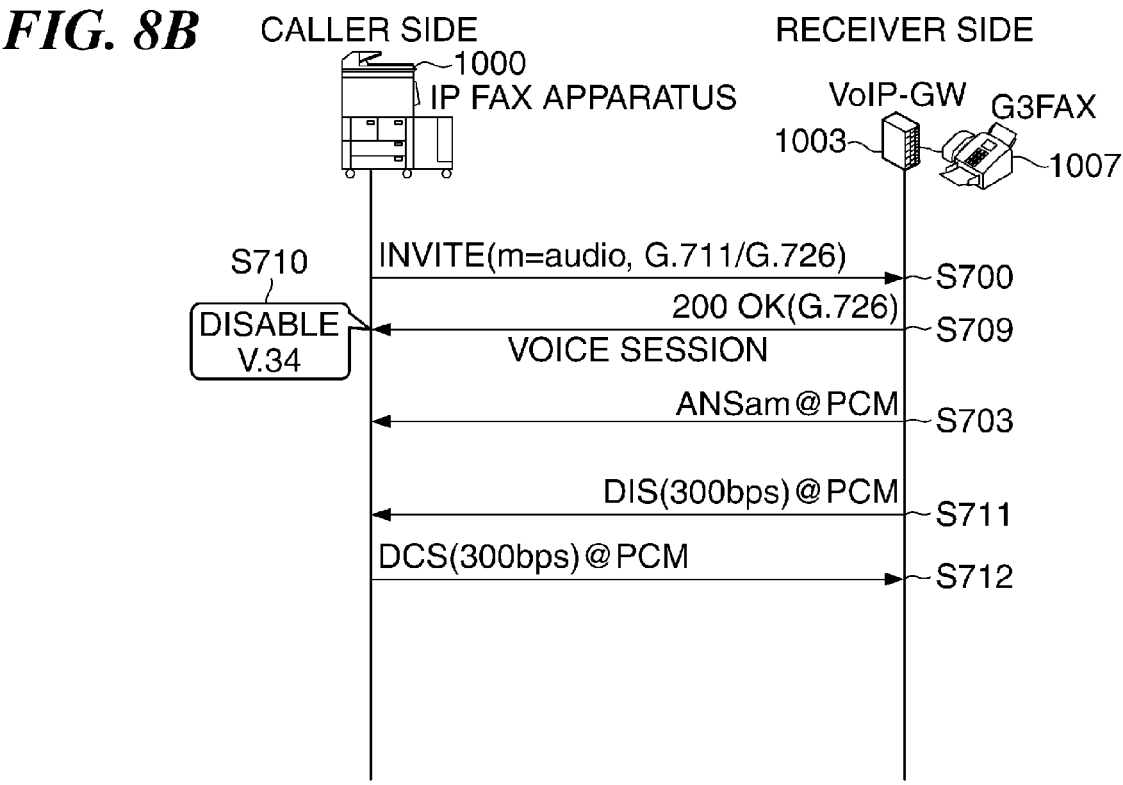

COMMUNICATION APPARATUS CAPABLE OF SELECTING PROPER FACSIMILE COMMUNICATION, METHOD OF CONTROLLING THE SAME, AND STORAGE MEDIUM

BACKGROUND OF THE INVENTION

Field of the Invention

The present invention relates to a communication apparatus that is capable of selecting proper facsimile communication, a method of controlling the same, and a storage medium.

Description of the Related Art

In recent years, to transmit and receive voice between an IP network and an analog telephone network, there has been widely spread a VoIP gateway (hereinafter referred to as the "VoIP-GW") using a VoIP (Voice over Internet Protocol) technology.

By connecting a G3 FAX to this VoIP-GW, it is possible to perform facsimile communication using inband communication. Facsimile communication includes not only facsimile communication using inband communication, but also facsimile communication using T.38 standardized in ITU-T recommendation.

In this T.38 facsimile communication, IP FAX communication can be performed by compressing the band, and a SIP (Session Initiation Protocol) is used as a call connection protocol in the IP network. In recent years, IP FAX apparatuses compatible with the T.38 protocol have come into wide use, and even high-speed facsimile communication can be performed between IP FAX apparatuses which are both compatible with the T.38 protocol.

To realize high-speed facsimile communication, some VoIP-GWs have a function of performing protocol conversion between T.38 and T.30 on a real-time basis (hereinafter, such a gateway will be referred to as the "T.38-GW").

By using this T.38-GW, facsimile communication can be performed between a T.38-compliant IP FAX apparatus and a G3 FAX apparatus. Further, there has been disclosed an IP FAX apparatus configured such that the IP FAX apparatus itself has the T.38-GW function (see e.g. Japanese Patent Laid-Open Publication No. 2013-121048).

According to the apparatus disclosed in Japanese Patent Laid-Open Publication No. 2013-121048, even when only VoIP-GWs without the T.38 function exist in the IP network, it is possible to perform not only facsimile communication using the T.38 protocol, but also facsimile communication using inband communication.

On the other hand, to cause an IP FAX apparatus without the gateway function to perform communication with a G3 FAX apparatus, the IP FAX apparatus is required to connect to a VoIP-GW or a T.38-GW.

In this case, if the gateway of a connection destination is a T.38-GW, it is desirable that the IP FAX apparatus selects not facsimile communication using inband communication, but facsimile communication using the T.38 protocol.

In view of this, a user registers whether or not the gateway of the connection destination is compatible with T.38, with the IP FAX apparatus in advance, whereby the IP FAX apparatus is enabled to properly select facsimile communication.

However, there is a case where the user does not know whether or not the gateway of the connection destination is compatible with T.38, and even if the user knows that, it is troublesome for the user to register whether or not the gateway of the connection destination is compatible with T.38 in advance.

SUMMARY OF THE INVENTION

The present invention provides a communication apparatus that is capable of selecting proper facsimile communication according to a gateway of a connection destination, a method of controlling the same, and a storage medium.

In a first aspect of the present invention, there is provided a communication apparatus that performs facsimile communication via a gateway connected to an IP network, comprising a voice session establishment unit configured to establish a voice session for performing voice communication, with the gateway, a T.38 communication unit configured to establish, in a case where a T.38 session establishment request for requesting establishment of a T.38 session for performing T.38 communication is received after the voice session has been established by the voice session establishment unit, the T.38 session and perform facsimile communication using the T.38 communication, and an inband communication unit configured to perform, in a case where the T.38 session establishment request is not received after the voice session has been established by the voice session establishment unit, facsimile communication using inband communication by the voice session.

In a second aspect of the present invention, there is provided a communication apparatus that performs facsimile communication via a gateway connected to an IP network, comprising a voice session establishment unit configured to establish a voice session for performing voice communication, with the gateway, a transmission unit configured to transmit a T.38 session establishment request for requesting establishment of a T.38 session for performing T.38 communication, to the gateway, after the voice session has been established by the voice session establishment unit, a T.38 communication unit configured to perform, in a case where a success response to the T.38 session establishment request transmitted by the transmission unit is received, facsimile communication using the T.38 communication by the established T.38 session, and an inband communication unit configured to perform facsimile communication using inband communication by the voice session, in a case where the success response is not received.

In a third aspect of the present invention, there is provided a method of controlling a communication apparatus that performs facsimile communication via a gateway connected to an IP network, comprising establishing a voice session for performing voice communication, with the gateway, establishing, in a case where a T.38 session establishment request for requesting establishment of a T.38 session for performing T.38 communication is received after the voice session has been established by said voice session-establishing, the T.38 session and performing facsimile communication using the T.38 communication, and performing, in a case where the T.38 session establishment request is not received after the voice session has been established by said voice session-establishing, facsimile communication using inband communication by the voice session.

In a fourth aspect of the present invention, there is provided a method of controlling a communication apparatus that performs facsimile communication via a gateway connected to an IP network, comprising establishing a voice session for performing voice communication, with the gateway, transmitting a T.38 session establishment request for requesting establishment of a T.38 session for performing T.38 communication, to the gateway, after the voice session has been established by said voice session-establishing, performing, in a case where a success response to the T.38 session establishment request transmitted by said transmitting is received, facsimile communication using the T.38 communication by the established T.38 session, and performing facsimile communication using inband communication by the voice session, in a case where the success response is not received.

In a fifth aspect of the present invention, there is provided a non-transitory computer-readable storage medium storing a computer-executable program for executing a method of controlling a communication apparatus that performs facsimile communication via a gateway connected to an IP network, wherein the method comprises establishing a voice session for performing voice communication, with the gateway, establishing, in a case where a T.38 session establishment request for requesting establishment of a T.38 session for performing T.38 communication is received after the voice session has been established by said voice session-establishing, the T.38 session and performing facsimile communication using the T.38 communication, and performing, in a case where the T.38 session establishment request is not received after the voice session has been established by said voice session-establishing, facsimile communication using inband communication by the voice session.

In a sixth aspect of the present invention, there is provided a non-transitory computer-readable storage medium storing a computer-executable program for executing a method of controlling a communication apparatus that performs facsimile communication via a gateway connected to an IP network, wherein the method comprises establishing a voice session for performing voice communication, with the gateway, transmitting a T.38 session establishment request for requesting establishment of a T.38 session for performing T.38 communication, to the gateway, after the voice session has been established by said voice session-establishing, performing, in a case where a success response to the T.38 session establishment request transmitted by said transmitting is received, facsimile communication using the T.38 communication by the established T.38 session, and performing facsimile communication using inband communication by the voice session, in a case where the success response is not received.

According to the present invention, in a case where a T.38 session establishment request is received after a voice session has been established, a T.38 session is established, and facsimile communication using T.38 communication is performed. Further, in a case where the T.38 session establishment request is not received after the voice session has been established, facsimile communication using inband communication is performed by the voice session, and hence it is possible to cause the communication apparatus to select proper facsimile communication according to a gateway of a connection destination.

Further features of the present invention will become apparent from the following description of exemplary embodiments (with reference to the attached drawings).

BRIEF DESCRIPTION OF THE DRAWINGS

FIG. 1 is a schematic constitution diagram of a communication system including an IP FAX apparatus as a communication apparatus according to an embodiment of the present invention.

FIG. 2 is a schematic constitution diagram of the IP FAX apparatus appearing in FIG. 1.

FIG. 3A is a diagram showing a structure of an INVITE message.

FIG. 3B is a diagram showing a structure of a 200 OK message.

FIG. 4A is a sequence diagram of a process performed when a facsimile is automatically transmitted via a T.38-GW.

FIG. 4B is a sequence diagram of a process performed when a facsimile is automatically transmitted via a VoIP-GW.

FIG. 6A is a sequence diagram of a process performed when a facsimile is manually transmitted via the T.38-GW.

FIG. 6B is a sequence diagram of a process performed when a facsimile is manually transmitted via the VoIP-GW.

FIG. 7A is a sequence diagram of a process performed when a facsimile is manually received via the T.38-GW.

FIG. 7B is a sequence diagram of a process performed when a facsimile is manually received via the VoIP-GW.

FIG. 8A is a sequence diagram of a process performed when a facsimile is automatically transmitted via the VoIP-GW that is compatible with G.711.

FIG. 8B is a sequence diagram of a process performed when a facsimile is automatically transmitted via the VoIP-GW that is not compatible with G.711.

DESCRIPTION OF THE EMBODIMENTS

Figure 5A:
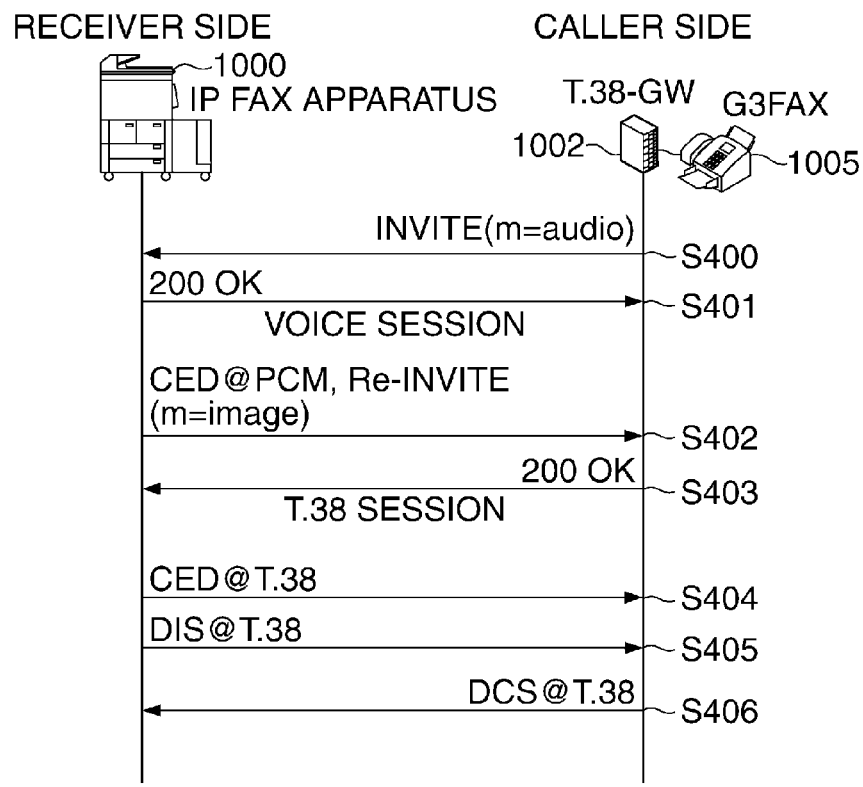
FIG. 5A is a sequence diagram of a process performed when a facsimile is automatically received via the T.38-GW.

The present invention will now be described in detail below with reference to the accompanying drawings showing embodiments thereof.

FIG. 1 is a schematic constitution diagram of a communication system 10 including an IP FAX apparatus 1000 as a communication apparatus according to an embodiment of the present invention.

Referring to FIG. 1, the communication system 10 is comprised of the IP FAX apparatus 1000, a T.38-GW 1002, a VoIP-GW 1003, analog telephone networks 1004 and 1006, and G3 FAXes 1005 and 1007.

The IP FAX apparatus 1000, the T.38-GW 1002, and the VoIP-GW 1003 are connected to a LAN 1008 which is an IP network. Further, the T.38-GW 1002 is connected to the analog telephone network 1004, to which the G3 FAX 1005 is connected.

The IP FAX apparatus 1000 performs T.38 communication with the T.38-GW 1002, and the T.38-GW 1002 performs analog voice communication with the G3 FAX 1005. This makes it possible to perform facsimile communication between the IP FAX apparatus 1000 and the G3 FAX 1005.

On the other hand, the VoIP-GW 1003 is connected to the analog telephone network 1006, to which the G3 FAX 1007 is connected.

The IP FAX apparatus 1000 performs inband communication with the VoIP-GW 1003, and the VoIP-GW 1003 performs analog voice communication with the G3 FAX 1007. This makes it possible to perform facsimile communication between the IP FAX apparatus 1000 and the G3 FAX 1007.

As described above, the IP FAX apparatus 1000 according to the present embodiment performs facsimile communication via a gateway connected to the IP network. Further, the IP FAX apparatus 1000 is capable of performing T.38 communication and inband communication, and can be connected to the T.38-GW 1002 having the T.38 function and the VoIP-GW 1003 without the T.38 function.

Note that the IP FAX apparatus 1000, the T.38-GW 1002, and the VoIP-GW 1003 are connected to the same LAN 1008, but may be connected to different IP networks, such as LANS and WANs, respectively. Further, in the following description, when referring to each of the T.38-GW 1002 and the VoIP-GW 1003 without distinguishing therebetween, or when describing a general gateway, the gateway is sometimes simply expressed as the GW.

FIG. 2 is a schematic constitution diagram of the IP FAX apparatus 1000 appearing in FIG. 1.

Referring to FIG. 2, the IP FAX apparatus 1000 includes a UI controller 102, a printer interface controller 104, and a scanner interface controller 106. Further, the IP FAX apparatus 1000 includes an image processor 107, a network interface controller 109, and a CPU 108, and these components are connected via a bus 121.

Further, the IP FAX apparatus 1000 includes a ROM 110, a RAM 111, an HDD 112, a modem interface controller 113, an SLIC PCM interface controller 116, and an SLIC interface controller 119, and these components are connected via the bus 121.

Further, the IP FAX apparatus 1000 further includes a user interface 101, a printer 103, a scanner 105, a power supply section 120, a modem 115, and an SLIC (Subscriber Line Interface Card) 117. Further, the SLIC 117 is connected to a child phone 118. The above-mentioned components are supplied with power from the power supply section 120 which is connected to a commercial power supply.

In the constitution described hereinabove, the CPU 108 controls the overall operation of the IP FAX apparatus 1000. The ROM 110 is a nonvolatile storage device that stores a boot program and fixed parameters. The RAM 111 is a volatile storage device that is used as a work area for operation of the CPU 108 and stores various data, such as image data. The HDD 112 is a nonvolatile storage device that stores various data, such as image data and information indicative of destinations of facsimile.

Processes indicated by sequence diagrams and flowcharts, described hereinafter, are performed by the CPU 108 executing programs which are stored in the HDD 112 or the ROM 110 and are loaded into the RAM 111.

Further, the RAM 111 and the HDD 112 are used as work areas in various processing operations, such as various image processing, resolution conversion, encoding, decoding, and processing concerning IP packets.

The user interface 101 receives various operations input by a user, and displays various information to the user. Particularly, the user interface 101 of the present embodiment includes a transmission start key for transmitting a facsimile, and a reception start key for receiving a facsimile. The UI controller 102 is connected to the user interface 101 to control the same.

The printer 103 prints an image on a recording medium, such as a sheet, and prints e.g. image data received by facsimile communication. The printer interface controller 104 is connected to the printer 103 to control the same.

The scanner 105 reads an original, and generates image data representative of an image of the original. The scanner interface controller 106 is connected to the scanner 105 to control the same. The image processor 107 performs various image processing, resolution conversion, encoding, decoding, and so forth, by hardware.

The network interface controller 109 controls transmission and reception of data exchanged via the LAN 1008, and analyzes and generates IP packets of the protocol of TCP, UDP, RTP, or the like. The data to be transmitted or having been received as IP packets is temporarily stored in the RAM 111 or the HDD 112, and then the stored data is interpreted by the CPU 108, whereby the data is processed according to the protocol.

The modem 115 is connected to a subscriber line, and further, is connected to the modem interface controller 113, which is an interface between the modem 115 and the CPU 108, by using a serial transfer method, such as a UART method or an SPI method. Further, the modem 115 is connected to a modem PCM interface controller 114. The modem 115 modulates/demodulates digital data into an analog voice signal based on an ITU-T recommendation, and performs data transmission and procedure control in facsimile communication via the subscriber line.

Further, the modem 115 incorporates a voice codec, which is a voice encoding/decoding circuit, and has a digital input/output function, and hence the modem 115 is capable of generating and inputting/outputting PCM data of a standard, such as G.711 or G.726.

The modem PCM interface controller 114 is an interface for exchanging PCM data between the modem 115 and the network interface controller 109.

The SLIC 117 is connected to the subscriber line, and further, is connected to the SLIC interface controller 119, which is an interface between the SLIC 117 and the CPU 108, by using the serial transfer method, such as the UART method or the SPI method. Further, the SLIC 117 is connected to the SLIC PCM interface controller 116.

The SLIC PCM interface controller 116 is an interface for exchanging PCM data between the SLIC 117 and the network interface controller 109.

The SLIC 117 includes an analog-digital conversion circuit, a digital-analog conversion circuit, a digital signal processor (hereinafter referred to as the "DSP"), and the voice encoding/decoding circuit, in a state integrated into the same chip.

The SLIC 117 performs analog-to-digital conversion of a voice signal input from a microphone of the child phone 118 and signal processing using the DSP to thereby convert the signal to PCM data of the standard, such as G.711 or G.726. This PCM data is sent from the SLIC PCM interface controller 116 to the network interface controller 109, and is transmitted to the LAN 1008.

Further, the SLIC 117 receives, from the SLIC PCM interface controller 116, PCM data of the standard, such as G.711 or G.726, which has been received from the LAN 1008 via the network interface controller 109.

The SLIC 117 decodes the received PCM data, performs signal processing of the decoded PCM data using the DSP, digital-to-analog conversion of the processed signal, and transmits the analog signal to the child phone 118. The child phone 118 is connected to the SLIC 117 via an interface for the analog telephone network, and a voice is output from a built-in speaker. Thus, it is possible to perform voice communication using the child phone 118 via the IP network.

Further, the SLIC 117 detects an off-hook state of the child phone 118, applies DC voltage, and sends a call signal to the child phone 118. Further, the SLIC 117 can also detect a destination designation signal for calling, by performing DTMF (Dual Tone Multi Frequency) detection, and pulse detection. Further, the SLIC 117 can also generate various tone signals.

Here, a description will be given of a case where call connection using a SIP (Session Initiation Protocol) is performed. First, in a case where the IP FAX apparatus automatically calls a GW, the CPU 108 acquires information indicative of a destination, which is stored in the HDD 112, and the network interface controller 109 generates, based on the acquired information, an INVITE message including a media attribute "m=audio", and transmits the generated INVITE message to the LAN 1008.

When the network interface controller 109 receives a 200 OK message as a success response from the GW, the network interface controller 109 transmits an ACK message to the GW, whereby a session is established as a voice session.

On the other hand, in a case where the IP FAX apparatus automatically receives a call from the GW, when the network interface controller 109 receives an INVITE message including "m=audio" from the GW, the network interface controller 109 generates a 200 OK message, and transmits the generated 200 OK message to the GW. When the network interface controller 109 receives an ACK message as a response to the 200 OK message, a session is established as a voice session.

Next, a method of performing inband communication using the above-mentioned PCM data will be described. First, a voice session is established between the IP FAX apparatus 1000 and a mating device by call connection control using the SIP. When transmitting an inband signal, data of a procedure signal and encoded image data are transmitted from the CPU 108 to the modem 115 via the modem interface controller 113, and the modem 115 generates a voice signal by modulating the received data.

Then, the modem 115 converts the voice signal to PCM data using the built-in voice codec. The PCM data is sent to the network interface controller 109 via the modem PCM interface controller 114, and is transmitted to the LAN 1008.

Note that the modem 115 converts not only the above-mentioned procedure signal data and image data, but also voice tones and DTMF tones to PCM data according to control commands received from the CPU 108 via the modem interface controller 113. Then, the PCM data is transmitted to the network interface controller 109 via the modem PCM interface controller 114.

Next, a description will be given of a case where an inband signal is received. When receiving an inband signal, the network interface controller 109 analyzes voice packets received from the LAN 1008, and sends PCM data extracted from the voice packets to the modem PCM interface controller 114.

The modem 115 receives the PCM data sent via the modem PCM interface controller 114, converts the PCM data to a voice signal using the built-in voice codec, and stores data obtained by demodulating a tone signal, a procedure signal, and an image signal, which are included in the voice signal, in the RAM 111 via the modem interface controller 113. The CPU 108 performs facsimile communication control and printing according to the data stored in the RAM 111.

Next, a method of performing T.38 communication will be described. The T.38 communication is performed in a state where a session is set up using the SIP based on the media attribute "m=image". The CPU 108 transmits the procedure signal data and the encoded image data not to the modem 115, but directly to the network interface controller 109. The network interface controller 109 converts the procedure signal data and the image data to T.38 IP packets, and transmits the IP packets to the LAN 1008.

On the other hand, when receiving T.38 packets, the network interface controller 109 analyzes the T.38 packets received from the LAN 1008, and stores the procedure signal and image data, extracted from the T.38 packets, in the RAM 111. The CPU 108 performs facsimile communication control and printing according to the data stored in the RAM 111.

FIG. 3A is a diagram showing a structure of the INVITE message, and FIG. 3B is a diagram showing a structure of the 200 OK message.

Referring to FIG. 3A, the INVITE message is comprised of an IP header part 201, a UDP/TCP header part 202, and an SIP part 203.

Further, the SIP part 203 is comprised of request information 204, an a SIP message header part 205, and a body part 208. The request information 204 indicates that this SIP message is a request message, and in the illustrated example in FIG. 3A, the request message is INVITE.

The SIP message header part 205 is comprised of sender information 206, destination information 207 indicative of a message transmission destination, and so forth. Further, the body part 208 includes SDP (Session Description Protocol) 209, and the SDP 209 is comprised of media information 210, media format information 211, and so forth.

Examples of the media information 210 include audio, image, application, and so forth. The media information "audio" is used when voice communication is performed, and the media information "image" and "application" are used when data communication, such as T.38 communication, is performed. The media format information 211 indicates the voice codec used in voice communication. Further, a plurality of items of the media format information 211 can be written together in the request message.

Next, the 200 OK message shown in FIG. 3B will be described. The 200 OK message differs from the INVITE message in that the request information 204 in the INVITE message is replaced by status information 212. As shown in FIG. 3B, the status information 212 indicates "200 OK".

Further, although a plurality of items of the media format information 211 can be written together in the INVITE message as mentioned above, the media format information 211 of the 200 OK message is only one item of the media format information 211, which is selected from the plurality of items written in the INVITE message.

Hereafter, a description will be given of a process performed by the IP FAX apparatus 1000 according to the present embodiment, for selecting proper facsimile communication.

Note that selecting proper facsimile communication is intended to mean, in the present embodiment, in a case where the GW has the T.38 function, selecting not facsimile communication using inband communication but facsimile communication using T.38 communication. On the other hand, the same is intended to mean, in a case where the GW does not have the T.38 function, selecting facsimile communication using inband communication.

FIG. 4A is a sequence diagram of a process performed when the IP FAX apparatus 1000 automatically transmits a facsimile via the T.38-GW 1002.

Referring to FIG. 4A, the IP FAX apparatus 1000 transmits an INVITE message including "m=audio" (step S300). The T.38-GW 1002 having received this INVITE message calls the G3 FAX 1005 via the analog telephone network 1004.

When the G3 FAX 10005 receives the call, the T.38-GW 1002 transmits a 200 OK message to the IP FAX apparatus 1000 (step S301), whereby a voice session is established. The steps S300 and S301 correspond to the operation of a voice session establishment unit configured to establish a voice session for performing voice communication, with a gateway.

Then, the T.38-GW 1002 converts a T.30 analog signal transmitted from the G3 FAX 1005 to PCM data, and transmits the PCM data to the IP FAX apparatus 1000 as an inband signal (step S302).

Then, the T.38-GW 1002 detects the T.30 analog signal to be used for facsimile communication, which has been transmitted from the G3 FAX 1005. The T.38-GW 1002 having detected the T.30 analog signal transmits a Re-INVITE message including "m=image", which is a T.38 session establishment request for performing T.38 communication, to the IP FAX apparatus 1000 so as to change the session to a T.38 session (step S303).

The IP FAX apparatus 1000 having received the Re-INVITE message transmits a 200 OK message as a response (step S304), whereby the session is changed to a T.38 session. After that, T.38 communication is performed between the IP FAX apparatus 1000 and the T.38-GW 1002 (steps S305 and S306).

The steps S303 to S306 correspond to the operation of a T.38 communication unit configured to establish, in a case where a T.38 session establishment request for requesting establishment of a T.38 session for performing T.38 communication is received after the voice session has been established by the voice session establishment unit, the T.38 session, and perform facsimile communication using the T.38 communication.

FIG. 4B is a sequence diagram of a process performed when the IP FAX apparatus 1000 automatically transmits a facsimile via the VoIP-GW 1003.

The steps S300 to S302 in FIG. 4B are the same as those in FIG. 4A. Since the VoIP-GW 1003 does not have the T.38 function, even when the VoIP-GW 1003 receives a T.30 analog signal sent from the G3 FAX 1007, the VoIP-GW 1003 does not transmit a Re-INVITE message.

Therefore, the VoIP-GW 1003 transmits the T.30 analog signal received from the G3 FAX 1007 to the IP FAX apparatus 1000 as the inband signal (step S307). The IP FAX apparatus 1000 also continues inband communication in a case where no Re-INVITE message is received from the GW, and transmits a DCS (Digital Command Signal) responsive to DIS (Digital Identification Signal) data received in the step S307 to the VoIP-GW 1003 as PCM data of an inband signal (step S308). After that, inband communication is performed between the IP FAX apparatus 1000 and the VoIP-GW 1003.

The steps S307 and S308 correspond to the operation of an inband communication unit configured to perform, in a case where the T.38 session establishment request is not received after the voice session has been established by the voice session establishment unit, facsimile communication using inband communication by the voice session.

The above-described processes are performed for automatic transmission of a facsimile. Next, processes performed for automatic reception of a facsimile will be described.

FIG. 5A is a sequence diagram of a process performed when the IP FAX apparatus 1000 automatically receives a facsimile via the T.38-GW 1002.

Referring to FIG. 5A, when the G3 FAX 1005 performs calling and the T.38-GW 1002 receives a call signal via the analog telephone network 1004, the T.38-GW 1002 transmits an INVITE message including "m=audio" to the IP FAX apparatus 1000 (step S400).

The IP FAX apparatus 1000 having received the INVITE message transmits a 200 OK message (step S401), whereby a voice session is established. The IP FAX apparatus 1000 converts a T.30 analog signal to PCM data and then transmits the PCM data to the T.38-GW 1002, and transmits a Re-INVITE message including "m=image" (step S402). This step S402 corresponds to the operation of a transmission unit configured to transmit a T.38 session establishment request for requesting establishment of a T.38 session for performing T.38 communication, to the gateway, after the voice session has been established by the voice session establishment unit.

The T.38-GW 1002 transmits a 200 OK message as a response to the Re-INVITE message (step S403), whereby the session is changed to a T.38 session. After that, T.38 communication is performed between the IP FAX apparatus 1000 and the T.38-GW 1002 (steps S404 to S406).

The steps S404 to S406 correspond to the operation of a T.38 communication unit configured to perform, in a case where a success response to the T.38 session establishment request transmitted by the transmission unit is received, facsimile communication using the T.38 communication by the established T.38 session.

Figure 5B:
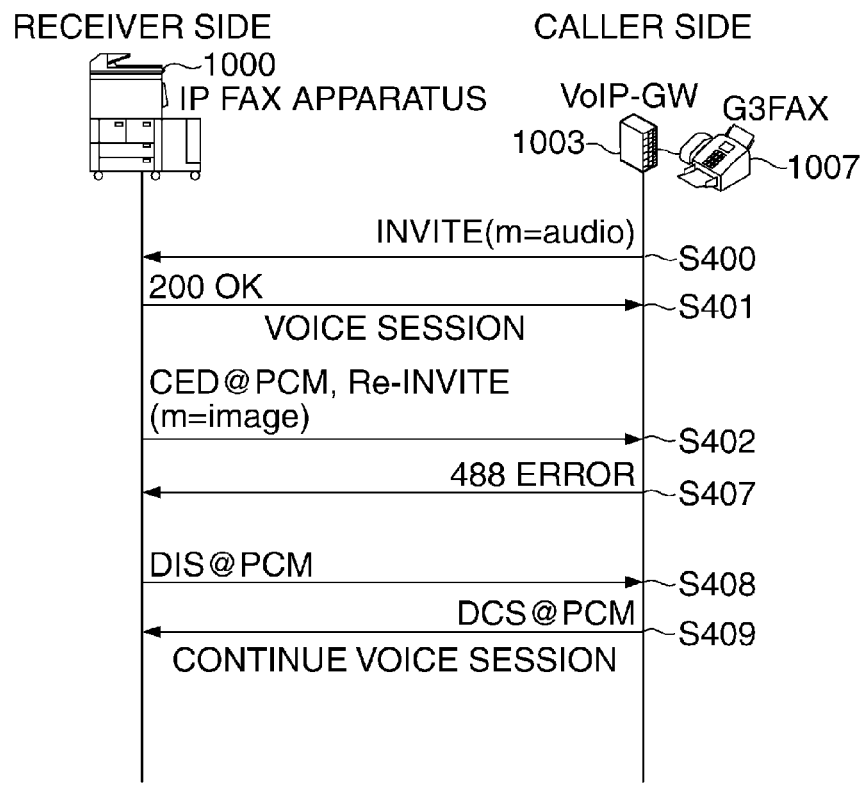
FIG. 5B is a sequence diagram of a process performed when a facsimile is automatically received via the VoIP-GW.

FIG. 5B is a sequence diagram of a process performed when the IP FAX apparatus 1000 automatically receives a facsimile via the VoIP-GW 1003.

Referring to FIG. 5B, the steps S400 to S402 are the same as those in FIG. 5A. Although the VoIP-GW 1003 receives the Re-INVITE message (step S402), since the VoIP-GW 1003 does not have the T.38 function, the VoIP-GW 1003 transmits a 488 (Not Acceptable Here) error response (step S407), or transmits nothing due to incapability of recognizing the Re-INVITE message.

In both cases, the IP FAX apparatus 1000 does not receive a 200 OK message as a response to the Re-INVITE message, and hence the IP FAX apparatus 1000 continues inband communication as it is (step S408). The session is not changed to a T.38 session, and is maintained as the voice session, and inband communication is performed between the IP FAX apparatus 1000 and the VoIP-GW 1003 (step S409). The steps S408 and S409 correspond to the operation of an inband communication unit configured to perform facsimile communication using inband communication by the voice session when the success response is not received.

The above-described processes in FIGS. 4A and 4B, 5A, and 5B are performed when a facsimile is automatically transmitted or received. Next, processes performed when a facsimile is manually transmitted will be described.

FIG. 6A is a sequence diagram of a process performed when a facsimile is manually transmitted from the IP FAX apparatus 1000 via the T.38-GW 1002.

Referring to FIG. 6A, dialing is manually performed from the child phone 118 connected to the IP FAX apparatus 1000, and the IP FAX apparatus 1000 transmits an INVITE message including "m=audio" to the T.38-GW 1002 (step S500).

The T.38-GW 1002 having received the INVITE message calls the G3 FAX 1005 via the analog telephone network 1004. When the G3 FAX 1005 receives the call, the T.38-GW 1002 transmits a 200 OK message to the IP FAX apparatus 1000 (step S501), whereby a voice session is established.

Then, the T.38-GW 1002 converts a T.30 analog signal sent from the G3 FAX 1005 to PCM data, and transmits the PCM data to the IP FAX apparatus 1000 as an inband signal (step S502).

Then, the T.38-GW 1002 detects a T.30 analog signal transmitted from the G3 FAX 1005, for use in facsimile communication. The T.38-GW 1002 having detected the T.30 analog signal transmits a Re-INVITE message including "m=image" to the IP FAX apparatus 1000 so as to change the session to a T.38 session (step S503).

If the IP FAX apparatus 1000 has not detected an input of the transmission start key yet at this time, the IP FAX apparatus 1000 holds a response without transmitting anything as the response to the Re-INVITE message. While the IP FAX apparatus 1000 holds the response, the T.38-GW 1002 continues inband communication until a 200 OK message is received (steps S504 and S505).

After that, if the IP FAX apparatus 1000 detects an input of the transmission start key, the IP FAX apparatus 1000 transmits a 200 OK message at this timing as the response, held until then, to the Re-INVITE message (step S506).

The session is changed to a T.38 session at this time, and after that, as indicated by steps S507 and S508, T.38 communication is performed between the IP FAX apparatus 1000 and the T.38-GW 1002.

As described above, after receiving a T.38 session establishment request and detecting an input of an instruction for starting facsimile transmission, the IP FAX apparatus 1000 according to the present embodiment establishes a T.38 session and performs facsimile communication using T.38 communication.

In a conventional IP FAX apparatus, in a case where an input of the transmission start key is not detected when the Re-INVITE message is received from the GW as in the above-mentioned step S503 in FIG. 6A, a negative response is transmitted to the T.38-GW 1002. However, if a negative response is transmitted as in the case of the conventional IP FAX apparatus, and then the IP FAX apparatus transmits a Re-INVITE message, there is a possibility that the GW rejects the Re-INVITE message.

Further, if the IP FAX apparatus transmits a Re-INVITE message immediately after detection of an input of the transmission start key before receiving a Re-INVITE message from the GW, the Re-INVITE message transmitted from the IP FAX apparatus and the Re-INVITE message transmitted from the GW cross each other. This may prevent the GW from properly responding to the Re-INVITE message from the IP FAX apparatus.

Therefore, the IP FAX apparatus 1000 according to the present embodiment transmits the 200 OK message in a case where conditions that the IP FAX apparatus 1000 receives a Re-INVITE message from the T.38-GW 1002 and also that the IP FAX apparatus 1000 detects an input of the transmission start key are satisfied. Further, if the above conditions are not satisfied, the IP FAX apparatus 1000 holds the response. Thus, the IP FAX apparatus 1000 is prevented from sending a response at improper timing, whereby it is possible to reduce the risk that the T.38-GW 1002 fails in switching the session to the T.38 session.

FIG. 6B is a sequence diagram of a process performed when a facsimile is manually transmitted from the IP FAX apparatus 1000 via the VoIP-GW 1003.

Referring to FIG. 6B, the steps S500 to S502 are the same as those in FIG. 6A. Since the VoIP-GW 1003 does not have the T.38 function, without performing a step corresponding to the step S503 in FIG. 6A, i.e. without transmitting a Re-INVITE message, the VoIP-GW 1003 continues inband communication (steps S504 and S505).

Then, when the IP FAX apparatus 1000 detects an input of the transmission start key, the IP FAX apparatus 1000 converts a CNG signal which is a T.30 call start signal to PCM data, and starts transmission of the PCM data as an inband signal (step S509). Note that the CNG in manual transmission is an option signal, and hence the IP FAX apparatus 1000 is not necessarily required to transmit the CNG.

Since the IP FAX apparatus 1000 has received no Re-INVITE message at or before the time point of execution of the step S509, the IP FAX apparatus 1000 does not transmit a 200 OK massage. Further, the SIP has no specification for which of a caller side and a receiver side should transmit a Re-INVITE message. Therefore, even if the IP FAX apparatus 1000 which is the caller side transmits a Re-INVITE message in the step S509, there is no problem as far as the protocol is concerned, but it is assumed here that the Re-INVITE message is not transmitted from the caller side.

This is to prevent a case where if the GW transmits a Re-INVITE message, the Re-INVITE messages transmitted from the caller side and the receiver side may cross each other as mentioned in the step S503 in FIG. 6A. If the Re-INVITE messages cross each other, there is a possibility that inband communication is not properly continued depending on a GW. Thus, in the illustrated case, inband communication is continued thereafter (steps S510 and S511).

As shown in FIG. 6B, described above, the Re-INVITE message is not transmitted from the IP FAX apparatus 1000 in the step S509, and hence it is possible to reduce the risk that the GW fails in continuing inband communication.

The IP FAX apparatus 1000 according to the present embodiment transmits a DCS to the gateway using inband communication when a T.38 session establishment request is not received and also an input of an instruction for starting facsimile transmission has been detected. As a consequence, the IP FAX apparatus 1000 performs facsimile transmission using inband communication.

The above-described processes in FIGS. 6A and 6B are performed when a facsimile is manually transmitted. Next, processes performed when a facsimile is manually received will be described.

FIG. 7A is a sequence diagram of a process performed when the IP FAX apparatus 1000 manually receives a facsimile via the T.38-GW 1002.

Referring to FIG. 7A, when the G3 FAX 1005 performs calling and the T.38-GW 1002 receives a call signal via the analog telephone network 1004, the T.38-GW 1002 transmits an INVITE message including "m=audio" to the IP FAX apparatus 1000 (step S600).

When the SLIC 117 of the IP FAX apparatus 1000 detects an off-hook state of the child phone 118, the IP FAX apparatus 1000 transmits a 200 OK message as a response to the received INVITE message (step S601), whereby a voice session is established.

At this time, in the case of automatic facsimile reception, the IP FAX apparatus 1000 immediately transmits a Re-INVITE message including "m=image", but in the case of manual facsimile reception, if the IP FAX apparatus 1000 transmits the Re-INVITE message, the session is changed to a T.38 session, which makes it impossible to perform voice communication. Therefore, the IP FAX apparatus 1000 does not transmit the Re-INVITE message at this time.

The T.38-GW 1002 converts a T.30 analog signal sent from the G3 FAX 1005 to PCM data, and transmits the PCM data to the IP FAX apparatus 1000 as an inband signal (steps S602 and 603).

In this state, the IP FAX apparatus 1000 has not detected an input of the reception start key yet, and hence the received PCM data is converted to an analog voice by the SLIC 117, and is output to the child phone 118.

After that, when the IP FAX apparatus 1000 detects an input of the reception start key, the IP FAX apparatus 1000 transmits an inband signal obtained by converting a T.30 CED (or ANSam) signal to PCM data to the T.38-GW 1002. Further, simultaneously therewith, the IP FAX apparatus 1000 transmits a Re-INVITE message including "m=image" (step S604).

The T.38-GW 1002 having received the Re-INVITE message transmits a 200 OK message (step S605), thereby changing the session to a T.38 session. After that, as indicated in steps S606 to S608, T.38 communication is performed between the IP FAX apparatus 1000 and the T.38-GW 1002.

The IP FAX apparatus 1000 according to the present embodiment transmits a T.38 session establishment request to a gateway after an input of an instruction for starting facsimile reception has been detected. Then, in a case where a success response is received, the IP FAX apparatus 1000 performs facsimile communication using T.38 communication by the established T.38 session.

FIG. 7B is a sequence diagram of a process performed when the IP FAX apparatus 1000 manually receives a facsimile via the VoIP-GW 1003.

Referring to FIG. 7B, the steps S600 to S604 are the same as those in FIG. 7A. The VoIP-GW 1003 receives a Re-INVITE message (step S604), but does not have the T.38 function. Therefore, the VoIP-GW 1003 transmits a 488 (Not Acceptable Here) error response (step S609), or transmits nothing due to incapability of recognizing the Re-INVITE message.

In both cases, the IP FAX apparatus 1000 does not receive a 200 OK message as a response to the Re-INVITE message, and hence the IP FAX apparatus 1000 continues inband communication without any change (step S610). The session is not changed to a T.38 session, but is maintained as the voice session, and inband communication is performed between the IP FAX apparatus 1000 and the VoIP-GW 1003 (step S611).

The IP FAX apparatus 1000 according to the present embodiment transmits the T.38 session establishment request to the gateway after an input of an instruction for starting facsimile reception has been detected. Then, in a case where no success response is received, the IP FAX apparatus 1000 performs facsimile communication using inband communication by the voice session.

As described hereinabove with reference to FIGS. 4A to 7B, in any of the cases of automatic transmission, automatic reception, manual transmission, and manual reception, the IP FAX apparatus 1000 can select proper facsimile communication. Further, the user is not required to register whether or not the GW has the T.38 function.

Next, a description will be given of a process for avoiding occurrence of a communication error, which is caused depending on the type of the voice codec included in the GW.

First, the above-mentioned communication error will be described. In a case where facsimile communication using inband communication is determined in advance, when the GW has only a compression voice codec of e.g. G.726 or G.729, a communication error is caused depending on the communication speed of the G3 FAX.

Most of recent facsimile apparatuses are compatible with V.34, a standard which defines the maximum transfer rate as 33.6 kbps. In this case, if the voice codec included in the GW is a non-compression voice codec of e.g. G.711 (64 kbps), a signal is not missed, and hence a communication error is not caused even in V.34 communication.

However, the transfer rate of G.726 is 32 kbps, and that of G.729 is 8 kbps, and hence if inband communication is performed using V.34 communication, a signal is missed, which causes a communication error.

To cope with this, a process for disabling V.34 depending on a voice codec included in the GW is performed, and this process will be described hereafter. Note that in the following description given with reference to FIGS. 8A, 8B, 9A, and 9B, it is assumed that the IP FAX apparatus 1000 and the G3 FAX 1007 are configured to enable V.34 communication.

FIG. 8A is a sequence diagram of a process performed when the IP FAX apparatus 1000 automatically transmits a facsimile via the VoIP-GW 1003 that is compatible with G.711.

Referring to FIG. 8A, the IP FAX apparatus 1000 transmits an INVITE message including "m=audio" to the VoIP-GW 1003 (step S700). Note that the media format information 211 included in the INVITE message at this time describes G.711 indicative of a non-compression voice codec and G.726 indicative of a compression voice codec. Although any other codec, such as a G.729 codec, may be simultaneously included in the media format information 211, it is omitted here.

The VoIP-GW 1003 having received the INVITE message transmits a 200 OK message including the media format information 211 of G.711 (step S701). Since the media format information 211 included in the received 200 OK message describes G.711, missing of information is not caused, and a communication error is not caused even if inband communication is performed, and hence the IP FAX apparatus 1000 holds V.34 enabled without disabling the same (step S702).

Then, since V.34 is enabled, the G3 FAX 1007 transmits an ANSam signal to the VoIP-GW 1003, and the VoIP-GW 1003 converts the ANSam signal to PCM data, and transmits the PCM data to the IP FAX apparatus 1000 (step S703).

Since V.34 is remains enabled, when the IP FAX apparatus 1000 detects the ANSam signal, the IP FAX apparatus 1000 transmits a V.8 response (steps S704 to S706), whereby V.34 communication is performed using an inband signal (steps S707 and S708).

FIG. 8B is a sequence diagram of a process performed when the IP FAX apparatus 1000 automatically transmits a facsimile via the VoIP-GW 1003 that is not compatible with G.711.

Referring to FIG. 8B, the IP FAX apparatus 1000 transmits an INVITE message including "m=audio" to the VoIP-GW 1003 (step S700). The VoIP-GW 1003 having received the INVITE message transmits a 200 OK message including the media format information 211 of G.726 (step S709).

Since the media format information 211 included in the received 200 OK message describes G.726, the IP FAX apparatus 1000 disables V.34 (step S710). Even when an ANSam signal is received from the VoIP-GW 1003 in the next step S703, the IP FAX apparatus 1000 does not transmit a V.8 response, but thereafter performs inband communication in a mode not higher than V.17 (steps S711 and S712).

The above-described processes in FIGS. 8A and 8B are performed when a facsimile is automatically transmitted. Next, processes performed when a facsimile is automatically received will be described.

Figure 9A:
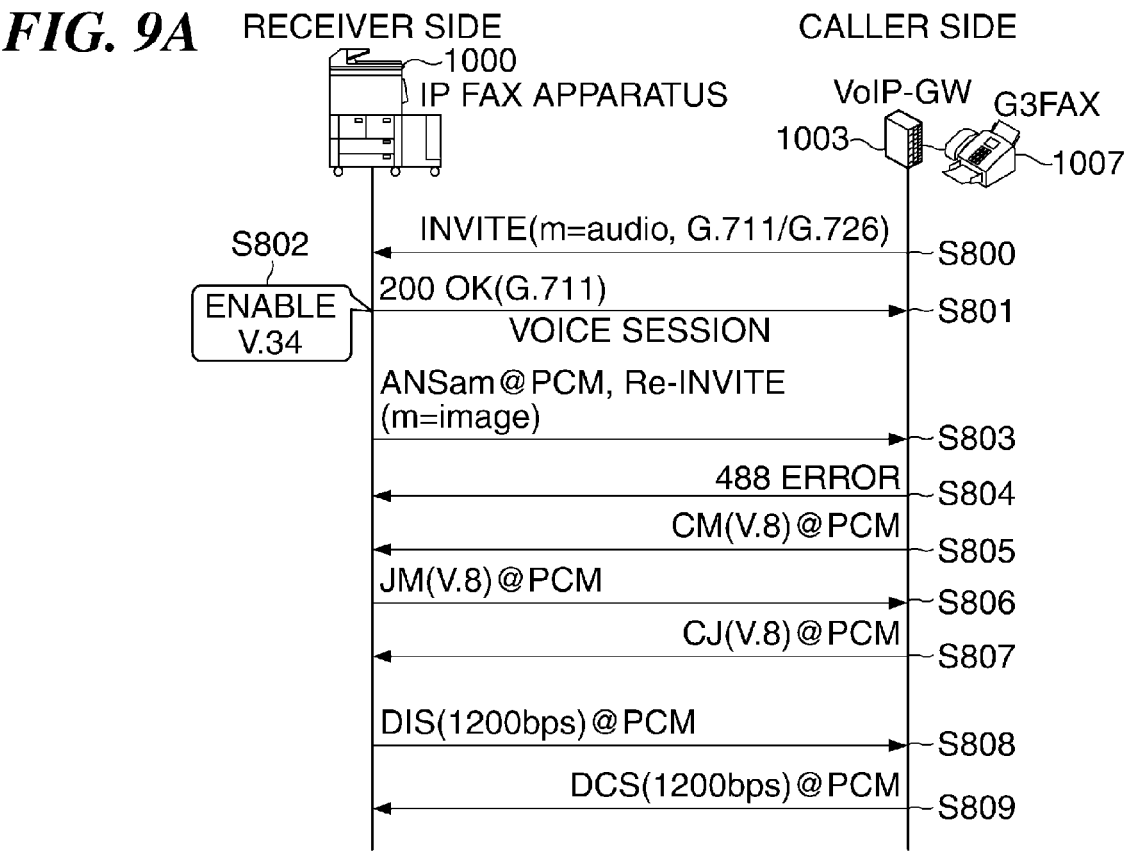
FIG. 9A is a sequence diagram of a process performed when a facsimile is automatically received via the VoIP-GW that is compatible with G.711.

FIG. 9A is a sequence diagram of a process performed when the IP FAX apparatus 1000 automatically receives a facsimile via the VoIP-GW that is compatible with G.711.

Referring to FIG. 9A, the IP FAX apparatus 1000 receives an INVITE message including "m=audio" from the VoIP-GW 1003 (step S800). Note that the media format information 211 included in the INVITE message at this time describes G.711 and G.726. Although it is to be understood that any other suitable codec, such as a codec of G.729, may be simultaneously included in the media format information 211, it is omitted here.

The IP FAX apparatus 1000 having received the INVITE message transmits a 200 OK message including the media format information 211 of G.711 (step S801). At this time, the IP FAX apparatus 1000 holds V.34 enabled without disabling the same (step S802).

Then, since V.34 is held enabled, the IP FAX apparatus 1000 converts an ANSam signal to PCM data and transmits the PCM data to the VoIP-GW 1003 (step S803). In this step S803, the IP FAX apparatus 1000 simultaneously transmits a Re-INVITE message including "m=image".

However, in this case, the VoIP-GW 1003 transmits a 488 error response (step S804), and hence inband communication is continued without changing the voice session. After that, a V.8 procedure for inband communication is performed between the IP FAX apparatus 1000 and the VoIP-GW 1003 (steps S805 to S807), and thereafter, V.34 communication using an inband signal is performed (steps S808 and S809).

Figure 9B:
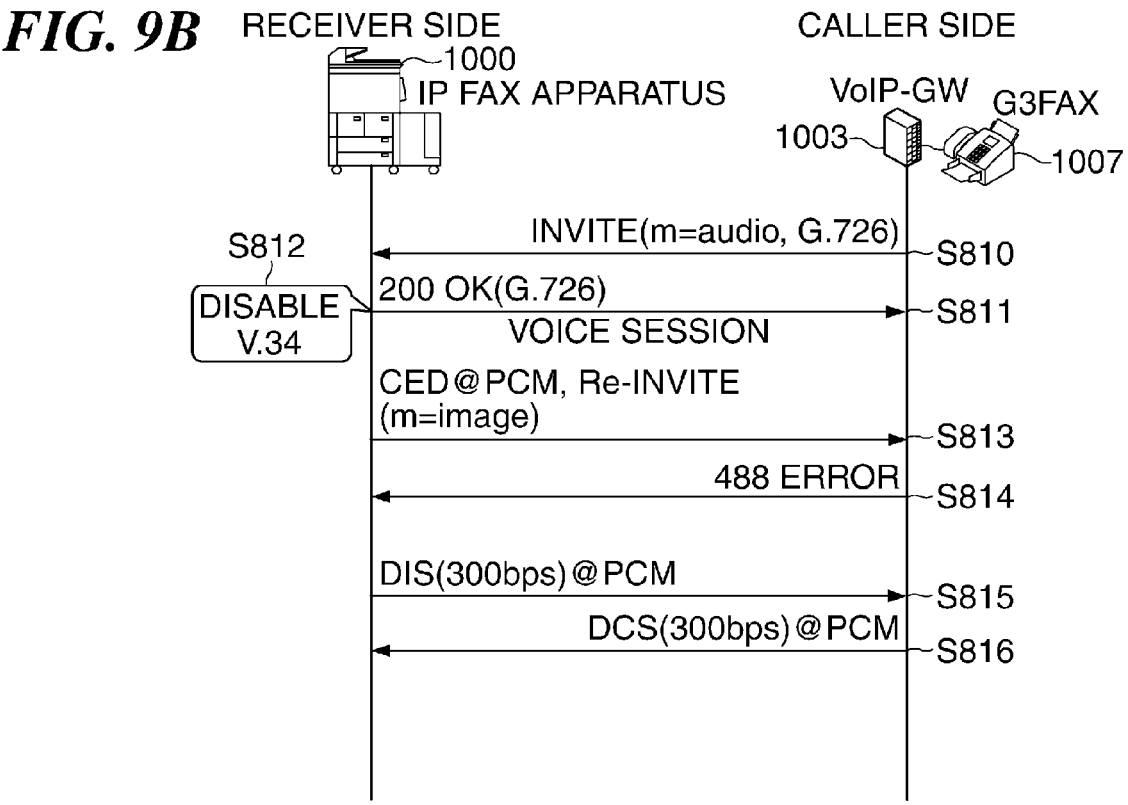
FIG. 9B is a sequence diagram of a process performed when a facsimile is automatically received via the VoIP-GW which is not compatible with G.711.

FIG. 9B is a sequence diagram of a process performed when the IP FAX apparatus 1000 automatically receives a facsimile via the VoIP-GW which is not compatible with G.711.

Referring to FIG. 9B, the IP FAX apparatus 1000 receives an INVITE message including "m=audio" from the VoIP-GW 1003 (step S810). It is assumed that the media format information 211 included in the INVITE message at this time describes G.726.

Since the media format information 211 included in the received INVITE message describes G.726, the IP FAX apparatus 1000 disables V.34 (step S812). Then, the IP FAX apparatus 1000 transmits a 200 OK message including the media format information 211 of G.726 (step S811).

Then, since the IP FAX apparatus 1000 has disabled V.34, it converts not an ANSam signal but a CED signal to PCM data, and transmits the PCM data to the VoIP-GW 1003 (step S813). In this step S813, the IP FAX apparatus 1000 simultaneously transmits a Re-INVITE message including "m=image", but the VoIP-GW 1003 transmits a 488 error response (step S814), and hence inband communication is continued without changing the voice session.

Thereafter, inband communication is performed between the IP FAX apparatus 1000 and the VoIP-GW 1003 in a mode not higher than V.17 (steps S815 and S816).

With the processes described with reference to FIGS. 8A, 8B, 9A, and 9B, the IP FAX apparatus 1000 is capable of dynamically enabling or disabling V.34 according to whether or not the voice codec included in the GW is a non-compression codec. As a consequence, if communication using V.34 is possible, high-speed communication using V.34 can be performed, whereas if not, it is possible to avoid occurrence of a communication error by reducing the communication speed.

The IP FAX apparatus 1000 according to the present embodiment disables V.34 communication when the IP FAX apparatus 1000 can perform V.34 communication but a voice codec used in an established session is not compatible with V.34.

Figure 10:
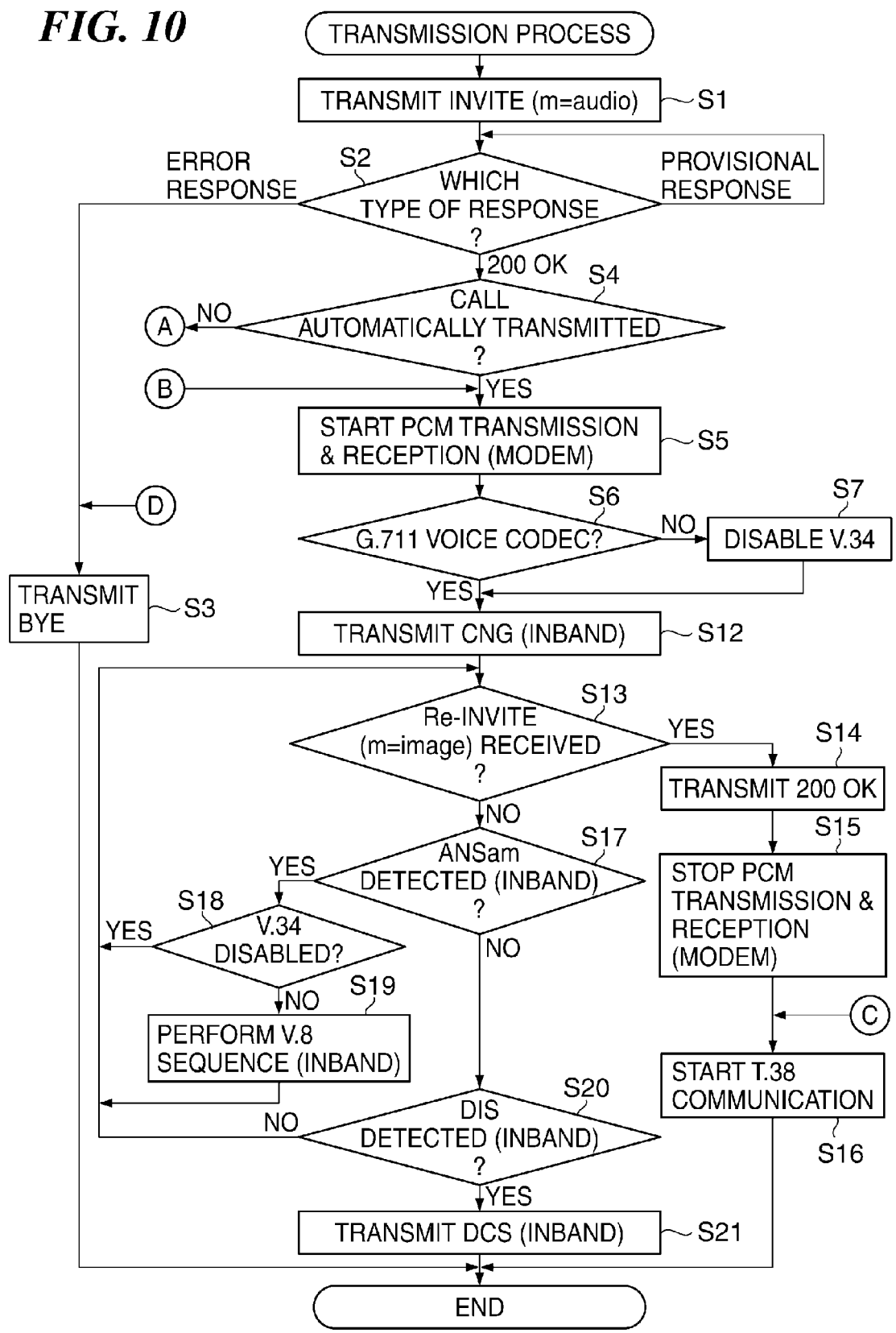
FIG. 10 is a flowchart of a transmission process performed by a CPU appearing in FIG. 2.
Figure 11:
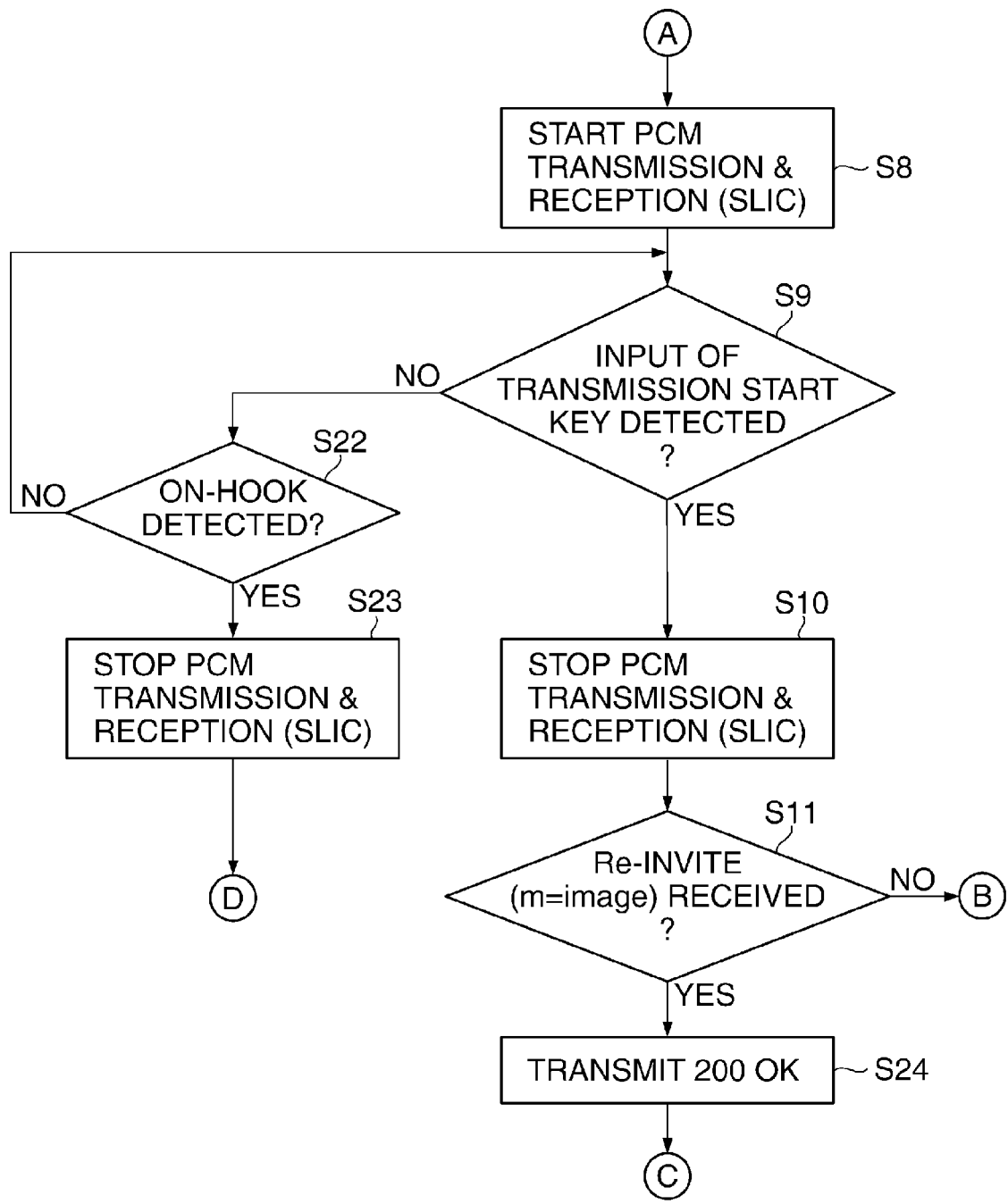
FIG. 11 is a continuation of FIG. 10.

FIGS. 10 and 11 are a flowchart of a transmission process performed by the CPU 108 of the IP FAX apparatus 1000 shown in FIG. 2.

The transmission process in FIGS. 10 and 11 is executed when the CPU 108 detects an input of the transmission start key, and when the CPU 108 detects a hook-up state and dialing of the child phone 118 by the SLIC 117. First, the case where the CPU 108 detects an input of the transmission start key will be described.

Referring to FIG. 10, when the CPU 108 detects an input of the transmission start key, the CPU 108 transmits an INVITE message including "m=audio" and the destination information 207 set to the address of the GW, to the GW (step S1).

Then, the CPU 108 determines a response to the INVITE message, which is transmitted from the GW (step S2). If it is determined in the step S2 that the response is a provisional response, such as a 100 Trying signal and a 180 Ringing signal (provisional response in the step S2), the process repeats the step S2.

Further, if it is determined in the step S2 that the response is an error response (error response in the step S2), it is impossible to expect that the communication is continued, and hence the CPU 108 transmits a BYE signal including the destination information 207 set to the address of the GW, to the GW (step S3), followed by terminating the present process.

If it is determined in the step S2 that the response is a 200 OK message (200 OK in the step S2), a voice session is established between the IP FAX apparatus 1000 and the GW.

Then, the CPU 108 determines whether or not this call has been automatically transmitted (step S4). If it is determined in the step S4 that the call has been automatically transmitted (YES to the step S4), the CPU 108 starts PCM transmission and reception by sending a PCM transmission and reception start instruction to the modem 115 based on the media format information 211 included in the received 200 OK message (step S5). As a consequence, inband communication is started.

Then, the CPU 108 determines whether or not the voice codec included in the GW is a G.711 codec based on the media format information 211 included the received 200 OK message (step S6). If it is determined in the step S6 that the voice codec is not a G.711 codec (NO to the step S6), the CPU 108 disables V.34 (step S7), and the process proceeds to a step S12.

On the other hand, if it is determined in the step S6 that the voice codec is a G.711 codec (YES to the step S6), the CPU 108 does not disable V.34 but holds V.34 enabled, and transmits a CNG signal by inband communication (step S12).

Then, the CPU 108 determines whether or not a Re-INVITE message including "m=image" has been received from the GW (step S13). If it is determined in the step S13 that a Re-INVITE message including "m=image" has not been received (NO to the step S13), the CPU 108 determines whether or not an ANSam signal has been detected by the modem 115 (step S17).

If it is determined in the step S17 that an ANSam signal has been detected (YES to the step S17), the CPU 108 determines whether or not V.34 is disabled (step S18). If it is determined in the step S18 that V.34 is disabled (YES to the step S18), the process returns to the step S13.

On the other hand, if it is determined in the step S18 that V.34 is not disabled (NO to the step S18), the CPU 108 instructs the modem 115 to transmit a V.8 response to thereby perform the V.8 sequence (step S19), and the process returns to the step S13.

Referring again to the step S17, if it is determined in the step S17 that an ANSam signal has not been detected (NO to the step S17), the CPU 108 determines whether or not a DIS (Digital Identification Signal) has been detected (step S20). If it is determined in the step S20 that a DIS has not been detected (NO to the step S20), the process returns to the step S13.

On the other hand, if it is determined in the step S20 that a DIS has been detected (YES to the step S20), the CPU 108 transmits a DCS using inband communication (step S21), followed by terminating the present process. After that, inband communication is performed.

On the other hand, if it is determined in the step S13 that a Re-INVITE message including "m=image" has been received (YES to the step S13), it means that T.38 communication can be performed, and hence the CPU 108 transmits a 200 OK message including the destination information 207 set to the address of the GW (step S14). As a consequence, the session is changed to a T.38 session.

Then, the CPU 108 sends a PCM transmission and reception stop instruction to the modem 115 to thereby stop PCM transmission and reception (step S15), and starts T.38 communication (step S16), followed by terminating the present process. After that, the CPU 108 transmits data, such as control signals, which have been transmitted to the modem 115 until then, directly to the network interface controller 109.

The network interface controller 109 converts the received data to T.38 data and transmits the same to the LAN 1008. Further, data received by the network interface controller 109 from the LAN 1008 is stored in the RAM 111 without via the modem 115, and the CPU 108 acquires the data.

Next, the case where the CPU 108 detects a hook-up state and dialing of the child phone 118 by the SLIC 117 will be described.

When the CPU 108 has detected the hook-up state and dialing of the child phone 118, the CPU 108 transmits an INVITE message including "m=audio" and the destination information 207 set to the address of the GW, to the GW (step S1). Here, as mentioned hereinabove, the CPU 108 acquires information indicative of the destination, stored in the HDD 112, and transmits the INVITE message to the destination indicated by the acquired information.

The next step S2 is the same as the process performed when the CPU 108 has detected an input of the transmission start key, and it is determined in the step S4 that the call is not automatically transmitted (NO to the step S4).

Referring to FIG. 11, the CPU 108 starts PCM transmission and reception by sending a PCM transmission and reception start instruction to the SLIC 117 based on the media format information 211 included in the 200 OK message received in the step S2 (step S8).

As a consequence, an analog voice input from the child phone 118 to the SLIC 117 is converted to PCM data using the voice codec of the SLIC 117, and the PCM data is transmitted to the LAN 1008. Further, the PCM data received by the network interface controller 109 via the LAN 1008 is sent to the SLIC 117. The SLIC 117 converts the received PCM data to an analog voice using the voice codec, and sends the analog voice to the child phone 118. Thus, voice communication using the child phone 118 via the IP network is enabled.

Then, the CPU 108 determines whether or not an input of the transmission start key has been detected (step S9). If it is determined in the step S9 that an input of the transmission start key has been detected (YES to the step S9), the CPU 108 sends a PCM transmission and reception stop instruction to the SLIC 117 to thereby stop PCM transmission and reception (step S10).

Then, the CPU 108 determines whether or not a Re-INVITE message including "m=image" has been received from the GW (step S11). If it is determined in the step S11 that a Re-INVITE message including "m=image" has not been received from the GW (NO to the step S11), the process proceeds to the step S5 in FIG. 10.

On the other hand, if it is determined in the step S11 that a Re-INVITE message including "m=image" has been received from the GW (YES to the step S11), it means that T.38 communication can be performed. Therefore, the CPU 108 transmits a 200 OK message including the destination information 207 set to the address of the GW (step S24). As a consequence, the session is changed to a T.38 session, and T.38 communication is started in the step S16 in FIG. 10.

Note that if a Re-INVITE message has been received before detecting an input of the transmission start key in the step S9, a 100 Trying signal is transmitted so as not to disconnect the session.

Referring again to the step S9, if it is determined in the step S9 that an input of the transmission start key has not been detected (NO to the step S9), the CPU 108 determines whether or not an on-hook state of the child phone 118 has been detected by the SLIC 117 (step S22).

If f it is determined in the step S22 that an on-hook state of the child phone 118 has not been detected (NO to the step S22), the process returns to the step S9.

On the other hand, if it is determined in the step S22 that an on-hook state of the child phone 118 has been detected (YES to the step S22), the CPU 108 sends a PCM transmission and reception stop instruction to the SLIC 117 to thereby stop PCM transmission and reception (step S23). Then, the CPU 108 transmits a BYE signal to the GW in the step S3 in FIG. 10.

Figure 12:
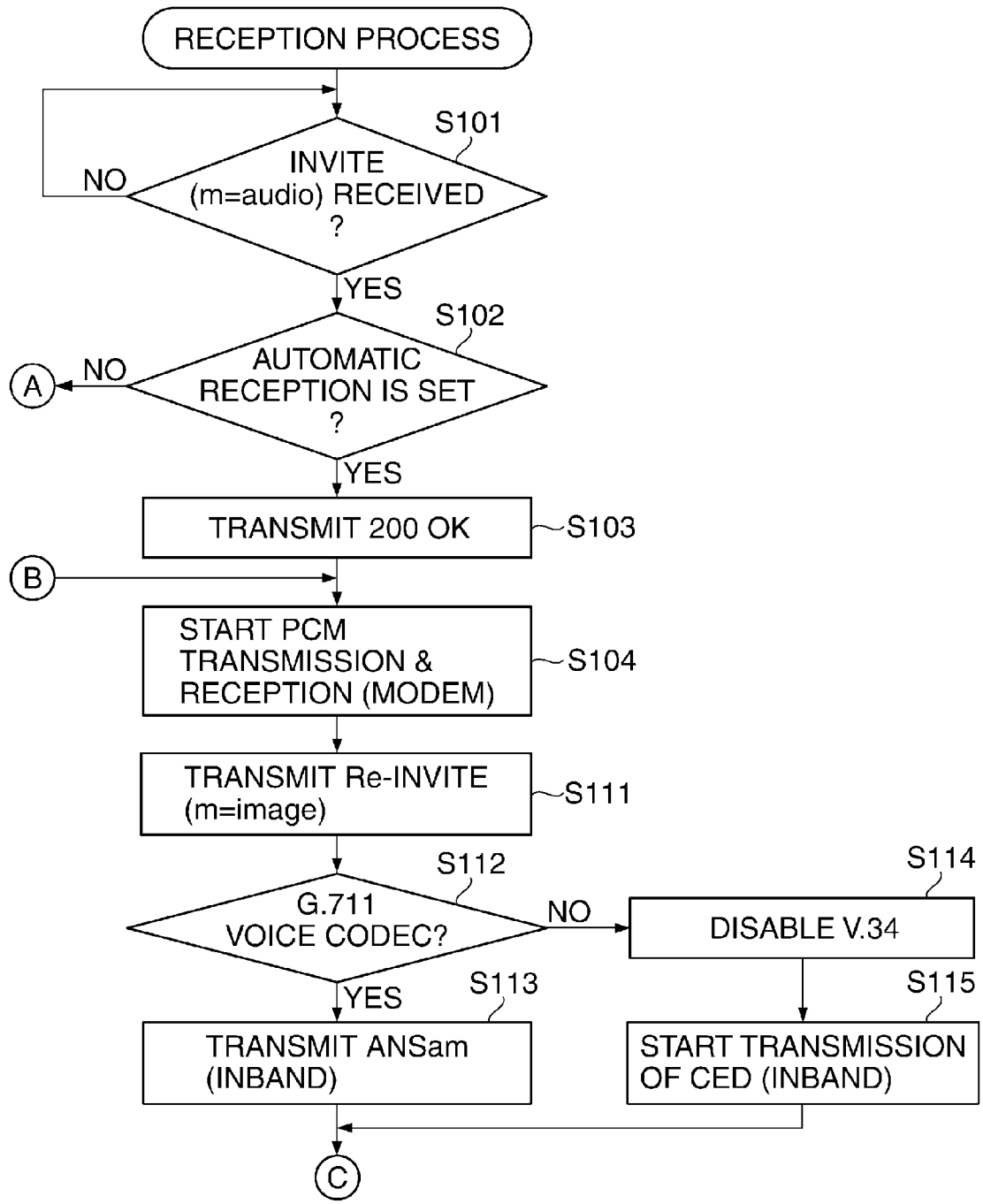
FIG. 12 is a flowchart of a reception process performed by the CPU appearing in FIG. 2.
Figure 13:
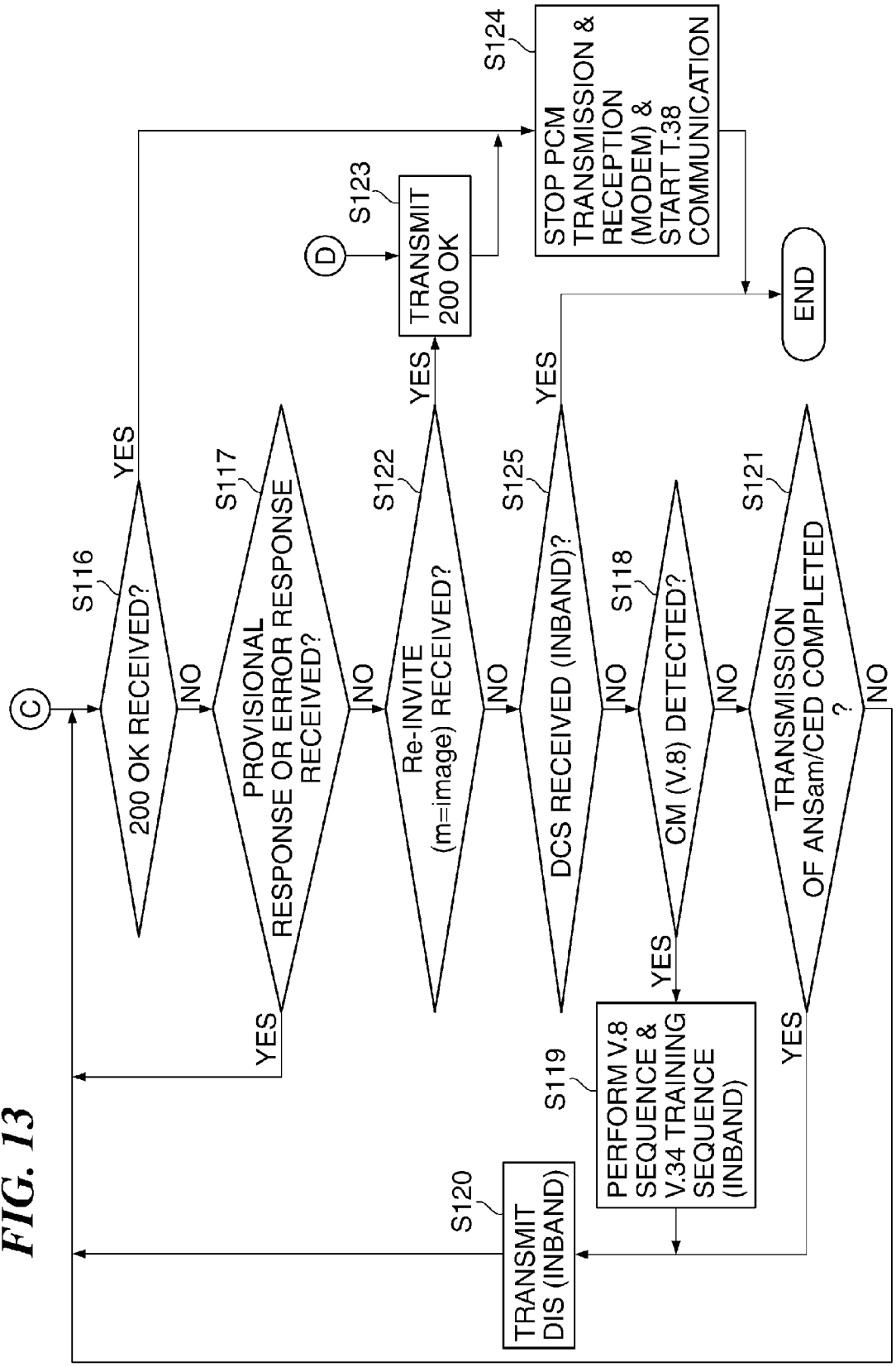
FIG. 13 is a continuation of FIG. 12.
Figure 14:
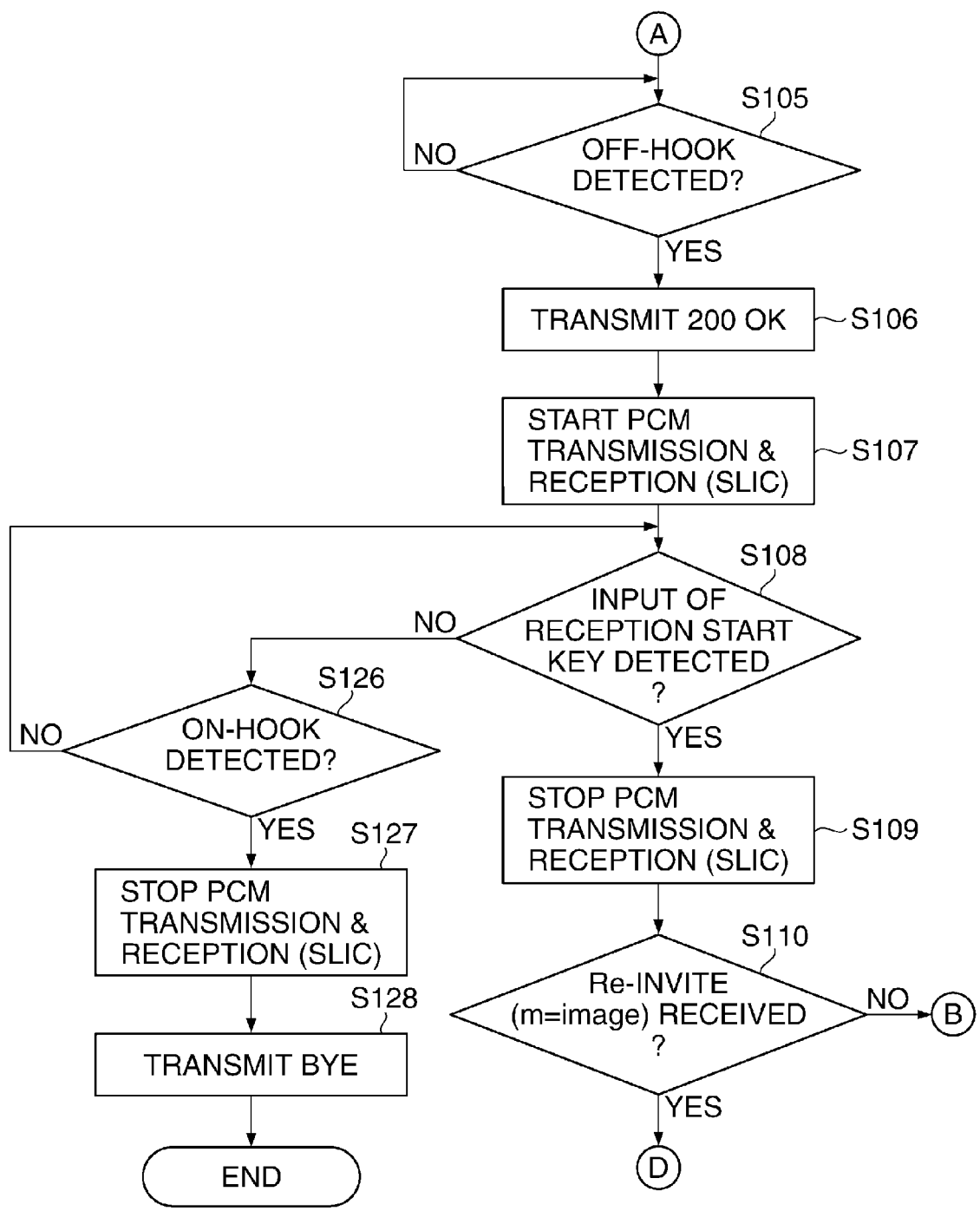
FIG. 14 is a continuation of FIG. 12.

FIGS. 12 to 14 are a flowchart of a reception process performed by the CPU 108 of the IP FAX apparatus 1000 shown in FIG. 2.

Referring to FIG. 12, when the CPU 108 receives an INVITE message including "m=audio", which has been transmitted from the GW (YES to a step S101), the CPU 108 determines whether or not the reception setting is automatic reception (step S102). The ROM 110 stores a setting concerning automatic reception, and hence the CPU 108 can perform the determination based on the setting stored in the ROM 110.

If it is determined in the step S102 that automatic reception is set (YES to the step S102), the CPU 108 transmits a 200 OK message including the destination information 207 set to the address of the GW (step S103).

Note that the media format information 211 included in the 200 OK message transmitted at this time describes a voice codec selected starting with the lowest one in compression ratio of all voice codecs described in the media format information 211 included in the INVITE message which has been received in the step S101. For example, the voice codec is selected in the order of G.711, G.726, and G.729. As a consequence, a voice session is established between the IP FAX apparatus 1000 and the GW.

Then, to perform inband communication, the CPU 108 starts PCM transmission and reception by sending a PCM transmission and reception start instruction to the modem 115 based on the voice codec selected from the media format information 211 in the step S103 (step S104).

Then, the CPU 108 transmits a Re-INVITE message including "m=image" and the destination information 207 set to the address of the GW, to the GW (step S111). Then, the CPU 108 determines whether or not the voice codec selected in the step S103 is a G.711 codec (step S112).

If it is determined in the step S112 that the voice codec is not a G.711 codec (NO to the step S112), the CPU 108 disables V.34 (step S114). Then, the CPU 108 sends a CED transmission start instruction to the modem 115 to thereby start transmission of the CED signal (step S115), and the process proceeds to a step S116 in FIG. 13.

On the other hand, if it is determined in the step S112 that the voice codec is a G.711 codec (YES to the step S112), the CPU 108 sends an ANSam delivery start instruction to the modem 115 while holding V.34 enabled. As a consequence, transmission of the ANSam signal is started (step S113), and the process proceeds to the step S116 in FIG. 13.

Referring to FIG. 13, the CPU 108 determines whether or not a 200 OK message has been received as a response to the Re-INVITE message transmitted in the step S111 (step S116). If it is determined in the step S116 that a 200 OK message has been received (YES to the step S116), since the session is changed to a T.38 session upon receipt of the 200 OK message, the CPU 108 stops PCM transmission and reception, and starts to perform T.38 communication (step S124), followed by terminating the present process.

If it is determined in the step S116 that a 200 OK message has not been received (NO to the step S116), the CPU 108 determines whether or not a provisional response, such as a 100 Trying signal and a 180 Ringing signal, or an error response has been received (step S117).

If it is determined in the step S117 that a provisional response or an error response has been received (YES to the step S117), the process returns to the step S116.

On the other hand, if it is determined in the step S117 that neither a provisional response nor an error response has been received (NO to the step S117), the CPU 108 determines whether or not a Re-INVITE message including "m=image" has been received (step S122). The step S122 assumes a case where a Re-INVITE message including "m=image" is transmitted from the GW of the calling side.

If it is determined in the step S122 that a Re-INVITE message including "m=image" has been received (YES to the step S122), the CPU 108 transmits a 200 OK message to the GW (step S123). Since the session is changed to a T.38 session upon transmission of the 200 OK message, the CPU 108 stops PCM transmission and reception and starts to perform T.38 communication (step S124), followed by terminating the present process.

On the other hand, if it is determined in the step S122 that a Re-INVITE message including "m=image" has not been received (NO to the step S122), the CPU 108 determines whether or not a DCS has been received (step S125). Note that the DCS in this step corresponds to the DIS transmitted in a step S120 described hereinafter.

If it is determined in the step S125 that the DCS has been received (YES to the step S125), the CPU 108 immediately terminates the present process. In this case, inband communication is performed. On the other hand, if it is determined in the step S125 that the DCS has not been received (NO to the step S125), the CPU 108 determines whether or not the modem 115 has detected a CM (Call Menu) signal indicating a V.8 response (step S118).

If it is determined in the step S118 that the modem 115 has detected a CM signal (YES to the step S118), the modem 115 performs the V.8 sequence according to an instruction from the CPU 108, and performs a V.34 training sequence using the inband signal (step S119). Then, the CPU 108 transmits the DIS using the inband signal (step S120), and the process returns to the step S116. Although not shown, even when the DCS is not received after transmitting the DIS, the DIS is not immediately retransmitted before the lapse of three seconds according to the T.30 standard, and hence the process does not proceed to the step S120 for three seconds.

Referring again to the step S118, if it is determined in the step S118 that the modem 115 has not detected a CM signal (NO to the step S118), the CPU 108 determines whether or not transmission of the ANSam or CED signal is completed (step S121).

If it is determined in the step S121 that transmission of the ANSam or CED signal is completed (YES to the step S121), the process proceeds to the step S120. On the other hand, if it is determined in the step S121 that transmission of the ANSam or CED signal is not completed (NO to the step S121), the process returns to the step S116.

Referring again to the step S102 in FIG. 12, if it is determined in the step S102 that the reception setting is not automatic reception (NO to the step S102), the process proceeds to a step S105 in FIG. 14.

When an off-hook state of the child phone 118 has been detected by the SLIC 117 (YES to the step S105), the CPU 108 transmits a 200 OK message including the destination information 207 set to the address of the GW, to the GW (step S106).

Note that the media format information 211 included in the 200 OK message transmitted at this time describes a voice codec selected starting with the lowest one in compression ratio of all voice codecs described in the media format information 211 included in the INVITE message received in the step S101. As a consequence, a voice session is established between the IP FAX apparatus 1000 and the GW.

Then, the CPU 108 sends a PCM transmission and reception start instruction to the SLIC 117 based on the voice codec selected from the media format information 211 in the step S106 to thereby start PCM transmission and reception (step S107). Thus, voice communication using the child phone 118 via the IP network is enabled.

Then, the CPU 108 determines whether or not an input of the reception start key has been detected (step S108). If it is determined in the step S108 that an input of the reception start key has been detected (YES to the step S108), the CPU 108 sends a PCM transmission and reception stop instruction to the SLIC 117 to thereby stop PCM transmission and reception (step S109).

Then, the CPU 108 determines whether or not a Re-INVITE message including "m=image" has been received from the GW (step S110). If it is determined in the step S110 that a Re-INVITE message including "m=image" has not been received (NO to the step S110), the process proceeds to the step S104 in FIG. 12. After that, the same process as performed in automatic reception is performed.

On the other hand, if it is determined in the step S110 that a Re-INVITE message including "m=image" has been received (YES to the step S110), the process proceeds to the step S123 in FIG. 13.

Referring again to the step S108, if it is determined in the step S108 that an input of the reception start key has not been detected (NO to the step S108), the CPU 108 determines whether or not an on-hook state of the child phone 118 has been detected by the SLIC 117 (step S126).

If it is determined in the step S126 that an on-hook of the child phone 118 has not been detected (NO to the step S126), the process returns to the step S108. On the other hand, if it is determined in the step S126 that an on-hook state of the child phone 118 has been detected (YES to the step S126), the CPU 108 sends a PCM transmission and reception stop instruction to the SLIC 117 to thereby stop PCM transmission and reception (step S127).

Then, the CPU 108 transmits a BYE signal including the destination information 207 set to the address of the GW, to the GW (step S128), followed by terminating the present process.

As described above, according to the present embodiment, in a case where a T.38 session establishment request is received after an voice session has been established (step S303), the T.38 session is established, and facsimile communication using T.38 communication is performed (steps S305 and S306).

Further, according to the present embodiment, in a case where a T.38 session establishment request is not received after an voice session has been established, facsimile communication using inband communication is performed by the voice session (steps S307 and S308).

With these processes, when the GW has the T.38 function, the IP FAX apparatus 1000 selects not facsimile communication using inband communication but facsimile communication using T.38 communication. Therefore, it is possible to cause the IP FAX apparatus 1000 to select proper facsimile communication according to a gateway of a connection destination. Further, the user is not required to register whether or not the GW has the T.38 function.

Further, according to the present embodiment, when a voice codec used in the established voice session is not compatible with V.34, communication using V.34 is disabled, whereby it is possible to avoid occurrence of a communication error.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-123321 filed Jun. 16, 2014, which is hereby incorporated by reference herein in its entirety.

What is claimed is:

1. A communication apparatus configured to perform facsimile communication via a gateway connected to an IP network, comprising:
   a storage device; and
   a processor configured to execute computer executable instructions recorded on the storage device, the computer executable instructions including instructions, that when executed by the processor, cause the communication apparatus to:
   establish a voice session for performing voice communication, with the gateway;
   receive, from the gateway, a T.38 session establishment request, wherein the T.38 session establishment request is received from the gateway before the gateway is notified whether a T.38 session can be established;
   establish, in a case where the T.38 session establishment request for requesting establishment of the T.38 session for performing T.38 communication is received from the gateway after the voice session has been established, the T.38 session and perform facsimile communication using the T.38 communication; and
   perform, in a case where the T.38 session establishment request is not received from the gateway after the voice session has been established, facsimile communication using inband communication by the voice session.

2. The communication apparatus according to claim 1, wherein in a case where an instruction for starting transmission of the facsimile is input by a user, the processor is configured to execute instructions that cause the communication apparatus to establish the T.38 session to thereby perform facsimile communication using the T.38 communication in response to the received T.38 session establishment request and after the input of the instruction by the user is detected.

3. The communication apparatus according to claim 1, wherein in a case where an instruction for starting transmission of the facsimile is input by a user, the processor is configured to execute instructions that cause the communication apparatus to transmit a DCS to the gateway using inband communication to thereby perform facsimile communication using the inband communication, in the case where the T.38 session establishment request has not been received and after the input of the instruction by the user is detected.

4. The communication apparatus according to claim 1, wherein in a case where the communication apparatus is capable of performing V.34 communication, and it is determined in advance that facsimile communication is performed using inband communication, the V.34 communication is disabled when a voice codec used for the established voice session is not compatible with V.34 communication.

5. A communication apparatus configured to perform facsimile communication via a gateway connected to an IP network, comprising:
   a storage device; and
   a processor connected to the storage device and configured to execute computer executable instructions recorded on the storage device, the computer executable instructions including instructions, that when executed by the processor, cause the communication apparatus to:
      establish a voice session for performing voice communication with the gateway;
      transmit to the gateway, after the voice session has been established and before receiving a response from the gateway that identifies whether a T.38 session can be established, a T.38 session establishment request for requesting establishment of the T.38 session for performing T.38 communication;
      establish, in a case where a success response to the T.38 session establishment request is received from the gateway, the T.38 session and perform facsimile communication using the T.38 communication by the established T.38 session; and
      perform facsimile communication using inband communication by the voice session, in a case where the success response is not received from the gateway.

6. The communication apparatus according to claim 5, wherein in a case where an instruction for starting reception of the facsimile is input by a user, the processor is configured to execute instructions that cause the communication apparatus to transmit the T.38 session establishment request to the gateway after the input of the instruction by the user is detected, and
   wherein in the case where the success response is received, facsimile communication is performed using the T.38 communication by the established T.38 session.

7. The communication apparatus according to claim 5, wherein in a case where an instruction for starting reception of the facsimile is input by a user, the processor is configured to execute instructions that cause the communication apparatus to transmit the T.38 session establishment request to the gateway, after the input of the instruction by the user is detected, and
   wherein in the case where the success response is not received, facsimile communication is performed using inband communication by the voice session.

8. The communication apparatus according to claim 5, wherein in a case where the communication apparatus is capable of performing V.34 communication, and it is determined in advance that facsimile communication is performed using the inband communication, the V.34 communication is disabled when a voice codec used for the established voice session is not compatible with V.34 communication.

9. A method of controlling a communication apparatus configured to perform facsimile communication via a gateway connected to an IP network, comprising:
   establishing a voice session for performing voice communication, with the gateway;
   receiving, from the gateway, a T.38 session establishment request, wherein the T.38 session establishment request is received from the gateway before the gateway is notified whether the T.38 session can be established;
   establishing, in a case where the T.38 session establishment request for requesting establishment of the T.38 session for performing T.38 communication is received from the gateway after the voice session has been established, the T.38 session and performing facsimile communication using the T.38 communication; and
   performing, in a case where the T.38 session establishment request is not received from the gateway after the voice session has been established, facsimile communication using inband communication by the voice session,
   wherein the gateway transmits the T.38 session establishment request before receiving information that identifies whether the T.38 session can be established.

10. A method of controlling a communication apparatus configured to perform facsimile communication via a gateway connected to an IP network, comprising:
    establishing a voice session for performing voice communication, with the gateway;
    transmitting to the gateway, after the voice session has been established and before receiving a response from the gateway that identifies whether a T.38 session can be established, a T.38 session establishment request for requesting establishment of the T.38 session for performing T.38 communication;
    establishing, in a case where a success response to the T.38 session establishment request is received from the gateway, the T.38 session and performing facsimile communication using the T.38 communication by the established T.38 session; and
    performing facsimile communication using inband communication by the voice session, in a case where the success response is not received from the gateway.

11. A non-transitory computer-readable storage medium storing a computer-executable program for executing a method of controlling a communication apparatus configured to perform facsimile communication via a gateway connected to an IP network,
    wherein the method comprises:
       establishing a voice session for performing voice communication, with the gateway;
       receiving, from the gateway, a T.38 session establishment request, wherein the T.38 session establishment request is received from the gateway before the gateway is notified whether the T.38 session can be established;
       establishing, in a case where the T.38 session establishment request for requesting establishment of the T.38 session for performing T.38 communication is received from the gateway after the voice session has been established, the T.38 session and performing facsimile communication using the T.38 communication; and
       performing, in a case where the T.38 session establishment request is not received from the gateway after the voice session has been established, facsimile communication using inband communication by the voice session.

12. A non-transitory computer-readable storage medium storing a computer-executable program for executing a method of controlling a communication apparatus configured to perform facsimile communication via a gateway connected to an IP network, wherein the method comprises:
  establishing a voice session for performing voice communication, with the gateway;
  transmitting to the gateway, after the voice session has been established and before receiving a response from the gateway that identifies whether a T.38 session can be established, a T.38 session establishment request for requesting establishment of the T.38 session for performing T.38 communication;
  establishing, in a case where a success response to the T.38 session establishment request is received from the gateway, the T.38 session and performing facsimile communication using the T.38 communication by the established T.38 session; and
  performing facsimile communication using inband communication by the voice session, in a case where the success response is not received from the gateway.

* * * * *